(12) United States Patent
Battle et al.

(10) Patent No.: US 11,320,294 B2
(45) Date of Patent: May 3, 2022

(54) MEASURED FLUID DISPENSER

(71) Applicant: AMS LLC, Canton, OH (US)

(72) Inventors: Matthew Battle, Canton, OH (US); Timothy Hayes, Lakewood, OH (US); Sean Barry, North Olmsted, OH (US); Adrian Bischoff, Chapel Hill, NC (US)

(73) Assignee: AMS LLC, Canton, OH (US)

( * ) Notice: Subject to any disclaimer, the term of this patent is extended or adjusted under 35 U.S.C. 154(b) by 0 days.

(21) Appl. No.: 17/046,188

(22) PCT Filed: Apr. 9, 2019

(86) PCT No.: PCT/US2019/026554
§ 371 (c)(1),
(2) Date: Oct. 8, 2020

(87) PCT Pub. No.: WO2019/199801
PCT Pub. Date: Oct. 17, 2019

(65) Prior Publication Data
US 2021/0063220 A1   Mar. 4, 2021

Related U.S. Application Data
(60) Provisional application No. 62/655,333, filed on Apr. 10, 2018.

(51) Int. Cl.
  *G01F 11/38* (2006.01)
  *A61J 1/05* (2006.01)
  *A61J 7/00* (2006.01)

(52) U.S. Cl.
  CPC ............. *G01F 11/38* (2013.01); *A61J 1/05* (2013.01); *A61J 7/0076* (2013.01); *A61J 2200/76* (2013.01)

(58) Field of Classification Search
  CPC . G01F 11/38; G01F 11/263; A61J 1/05; A61J 7/0076; A61J 2200/76; B65D 47/283; B65D 47/286
  (Continued)

(56) References Cited

U.S. PATENT DOCUMENTS

| | | | | |
|---|---|---|---|---|
| 3,130,874 A | * | 4/1964 | Bulmer | A47G 19/34 222/142.8 |
| 3,578,209 A | * | 5/1971 | Fraser | A01K 61/85 222/23 |

(Continued)

FOREIGN PATENT DOCUMENTS

| | | |
|---|---|---|
| JP | 2012111526 A | 6/2012 |
| KR | 101679261 B1 | 11/2016 |
| KR | 20170023373 A | 3/2017 |

OTHER PUBLICATIONS

International Search Report and Written Opinion of corresponding International Application No. PCT/US2019/026554 dated Jul. 5, 2019.

*Primary Examiner* — Vishal Pancholi
*Assistant Examiner* — Robert K Nichols, II
(74) *Attorney, Agent, or Firm* — Renner, Otto, Boisselle & Sklar LLP

(57) ABSTRACT

A fluid dispenser for measuring and dispensing fluid from a container includes a housing having a measurement chamber that defines a volume for receiving a predefined quantity of the fluid, a fluid flow passage having an inlet configured to be in fluid communication with the fluid in the container, and an outlet in fluid communication with the measurement chamber, such that the fluid flow passage permits fluid flow between the container and the measurement chamber. A valve member is provided that is movable in the flow passage to open the flow passage to permit fluid flow from the container to the measurement chamber to thereby allow (Continued)

the volume of the measurement chamber to fill with the predefined quantity of fluid; and to close the flow passage to restrict fluid flow from the container to the measurement chamber, and to isolate the predefined quantity of fluid to the measurement chamber.

17 Claims, 13 Drawing Sheets

(58) Field of Classification Search
USPC ...... 222/71, 559, 561, 562, 563, 426, 142.9, 222/424.5, 158
See application file for complete search history.

(56) References Cited

U.S. PATENT DOCUMENTS

| | | | |
|---|---|---|---|
| 6,126,043 A * | 10/2000 | Albert, II | B67D 1/0002 222/340 |
| 6,244,470 B1 * | 6/2001 | Harley-Wilmot | G01F 11/263 222/153.14 |
| 10,058,484 B2 | 8/2018 | Battle | |
| 2010/0286650 A1 * | 11/2010 | Fitzgerald | A61J 1/1412 604/500 |
| 2016/0243003 A1 | 8/2016 | Battle | |

* cited by examiner

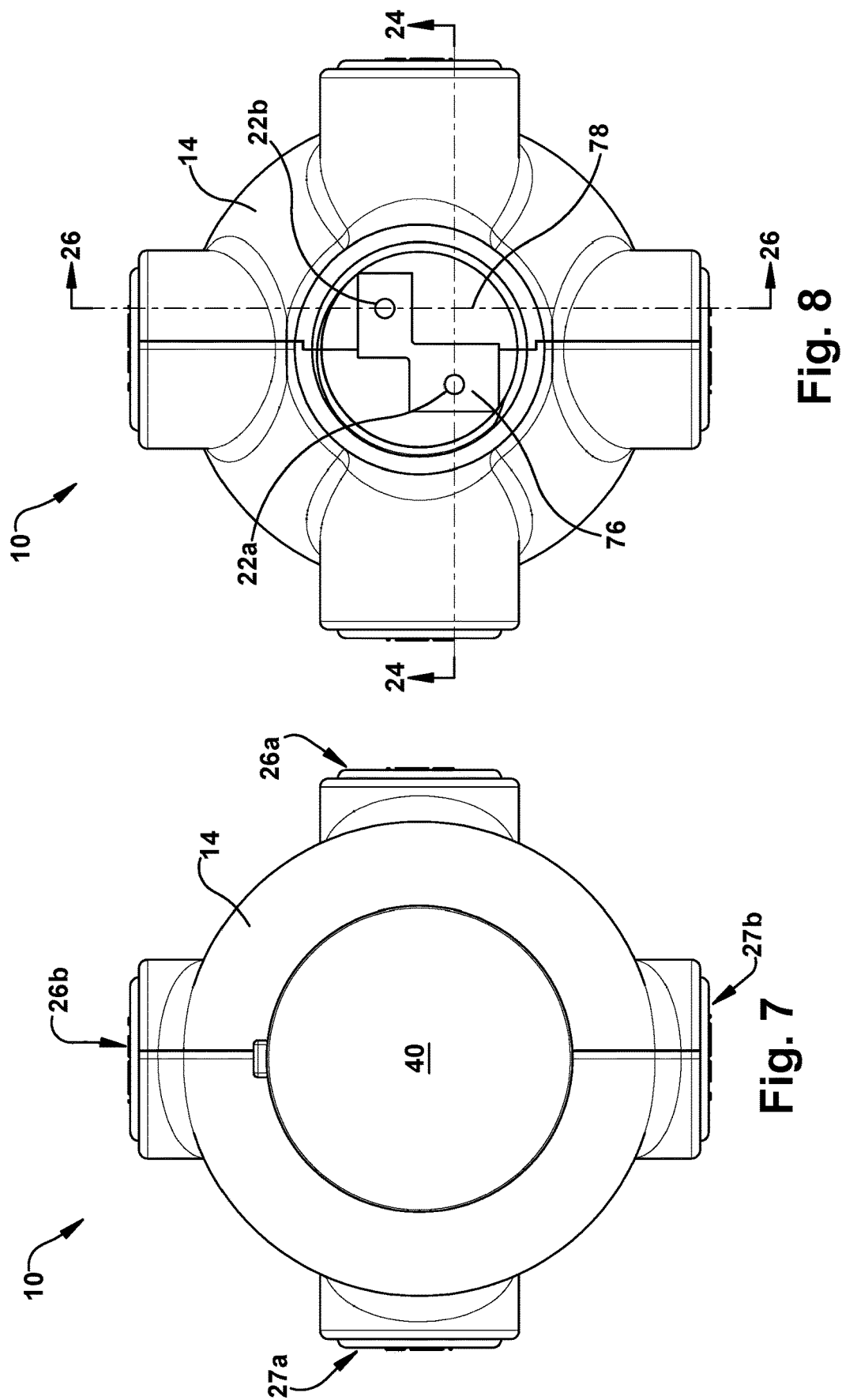

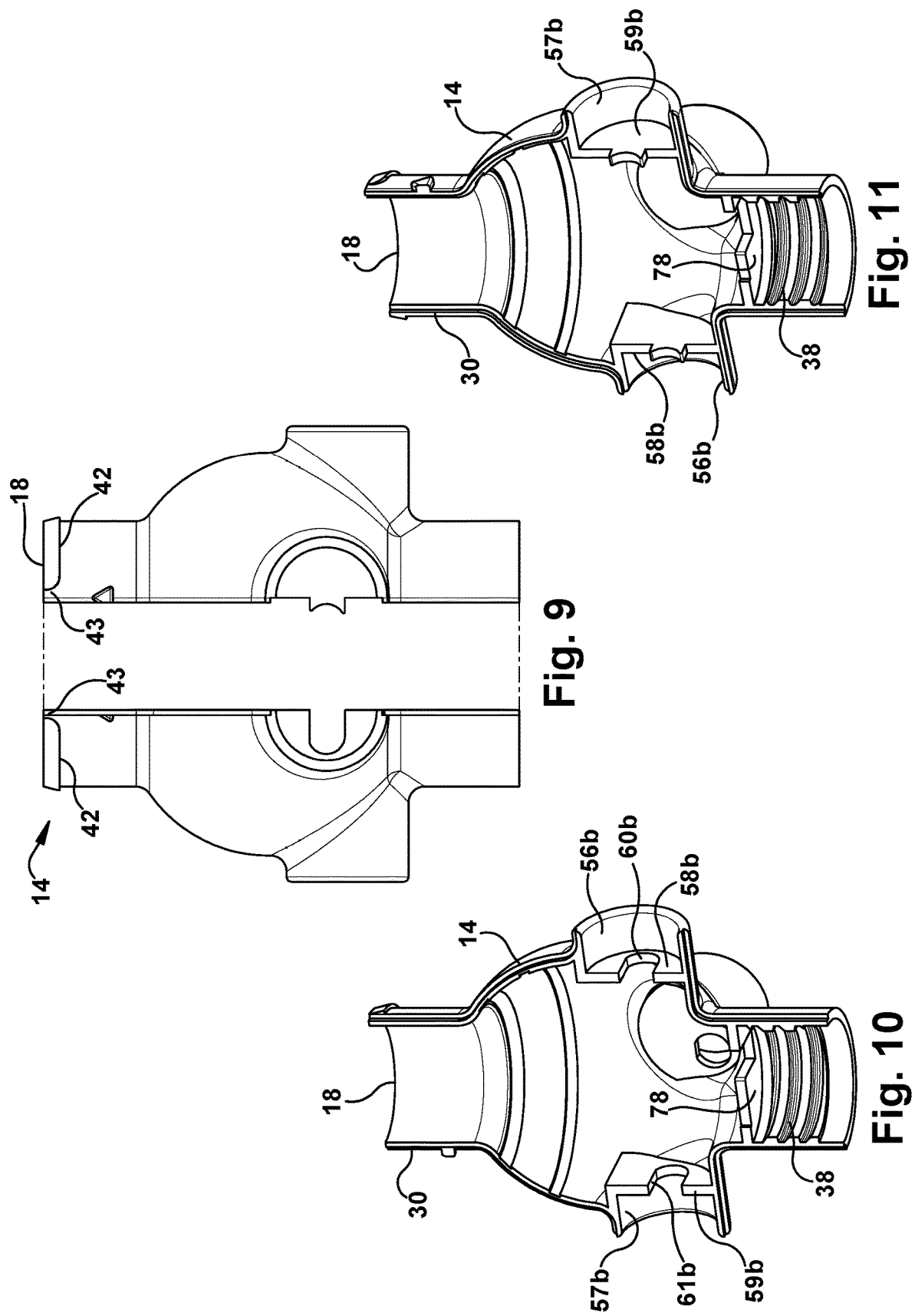

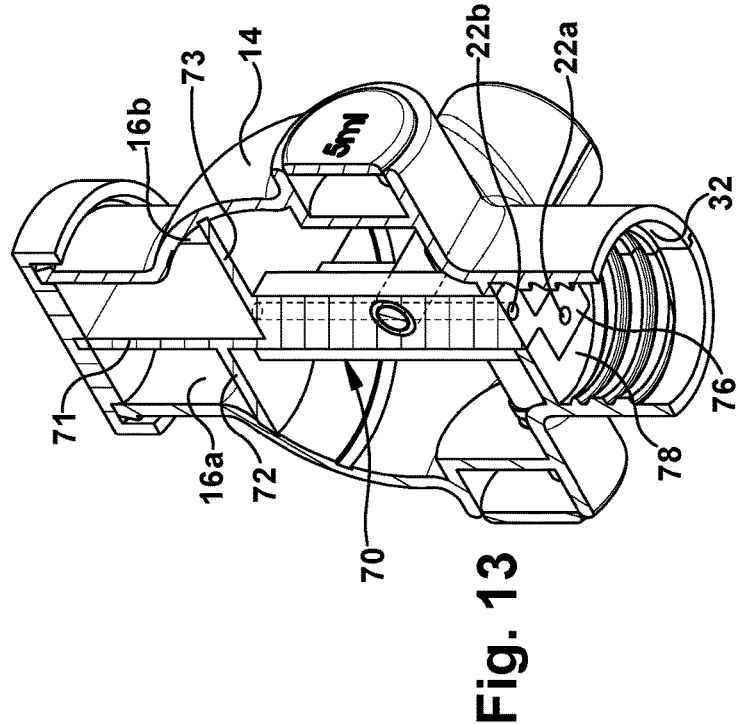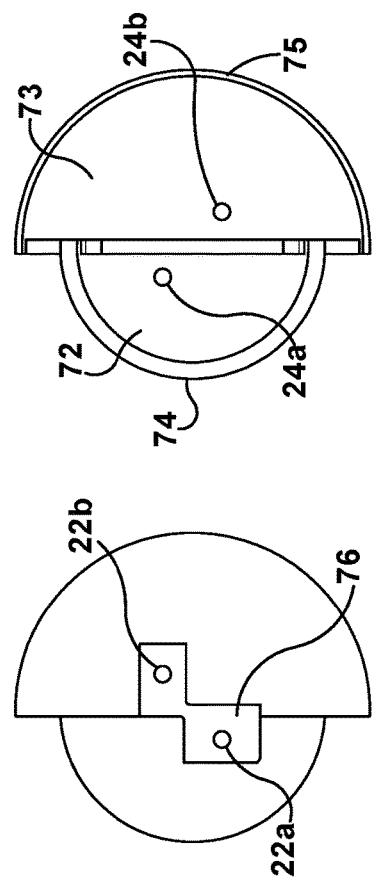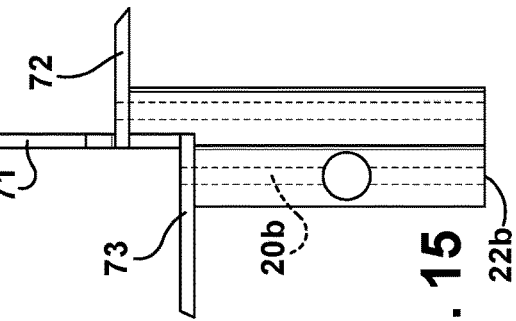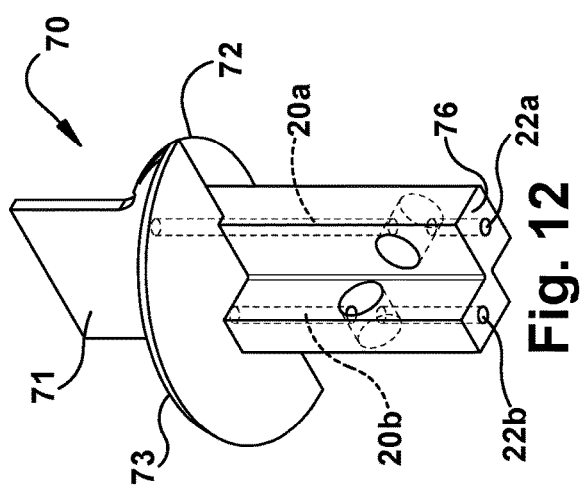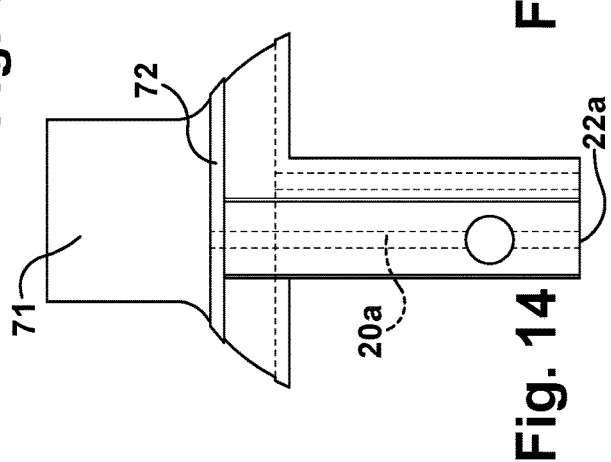

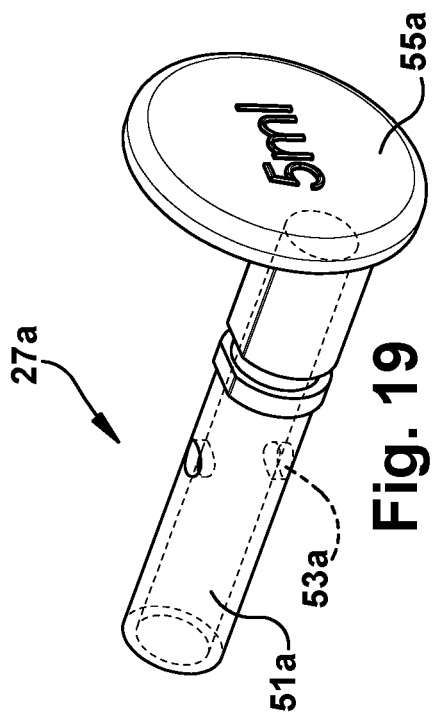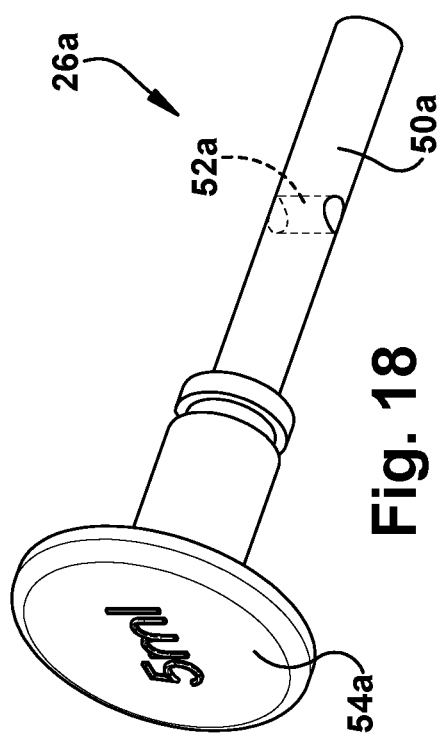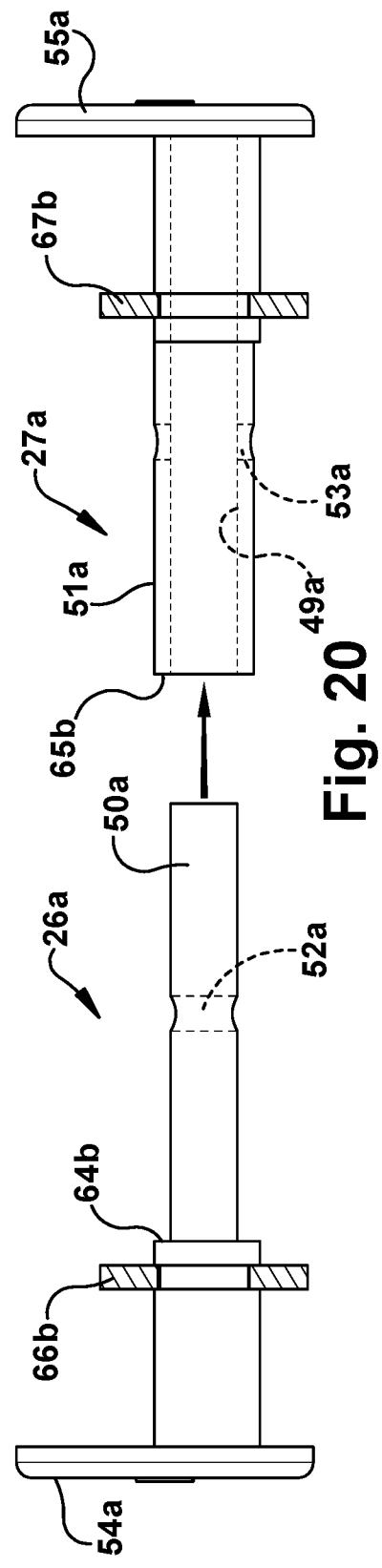

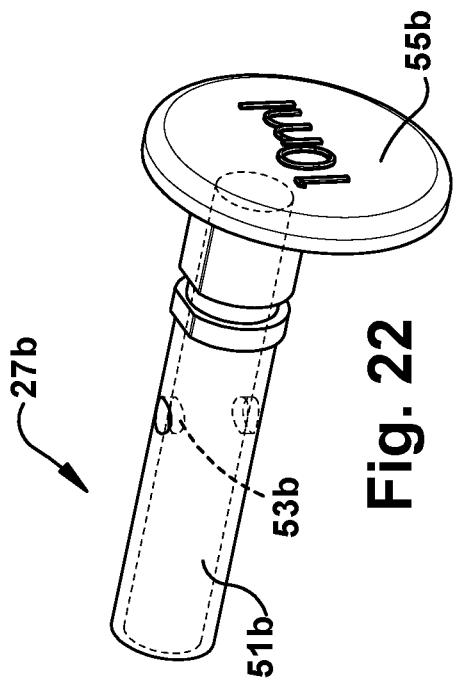
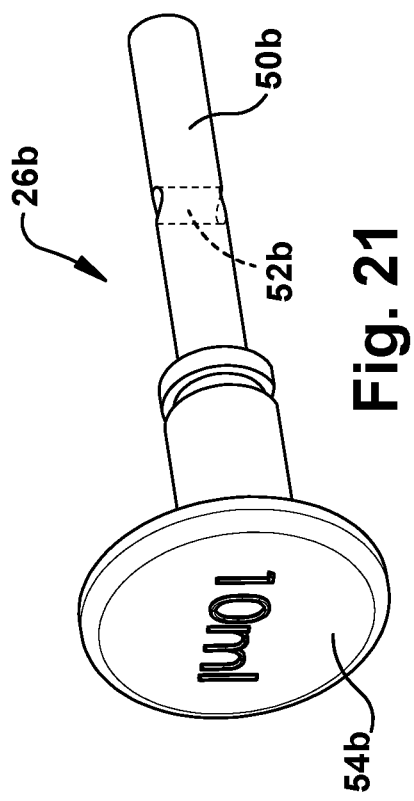
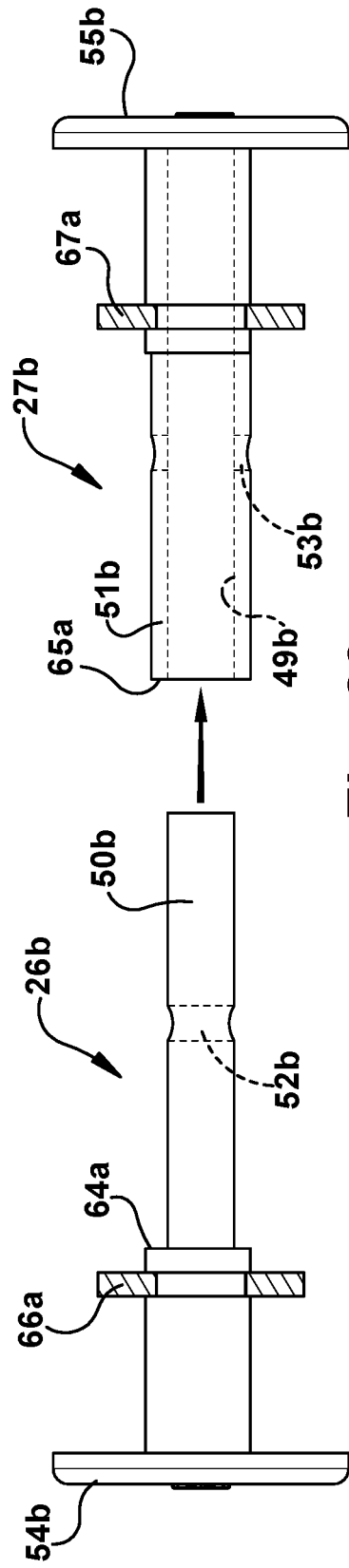

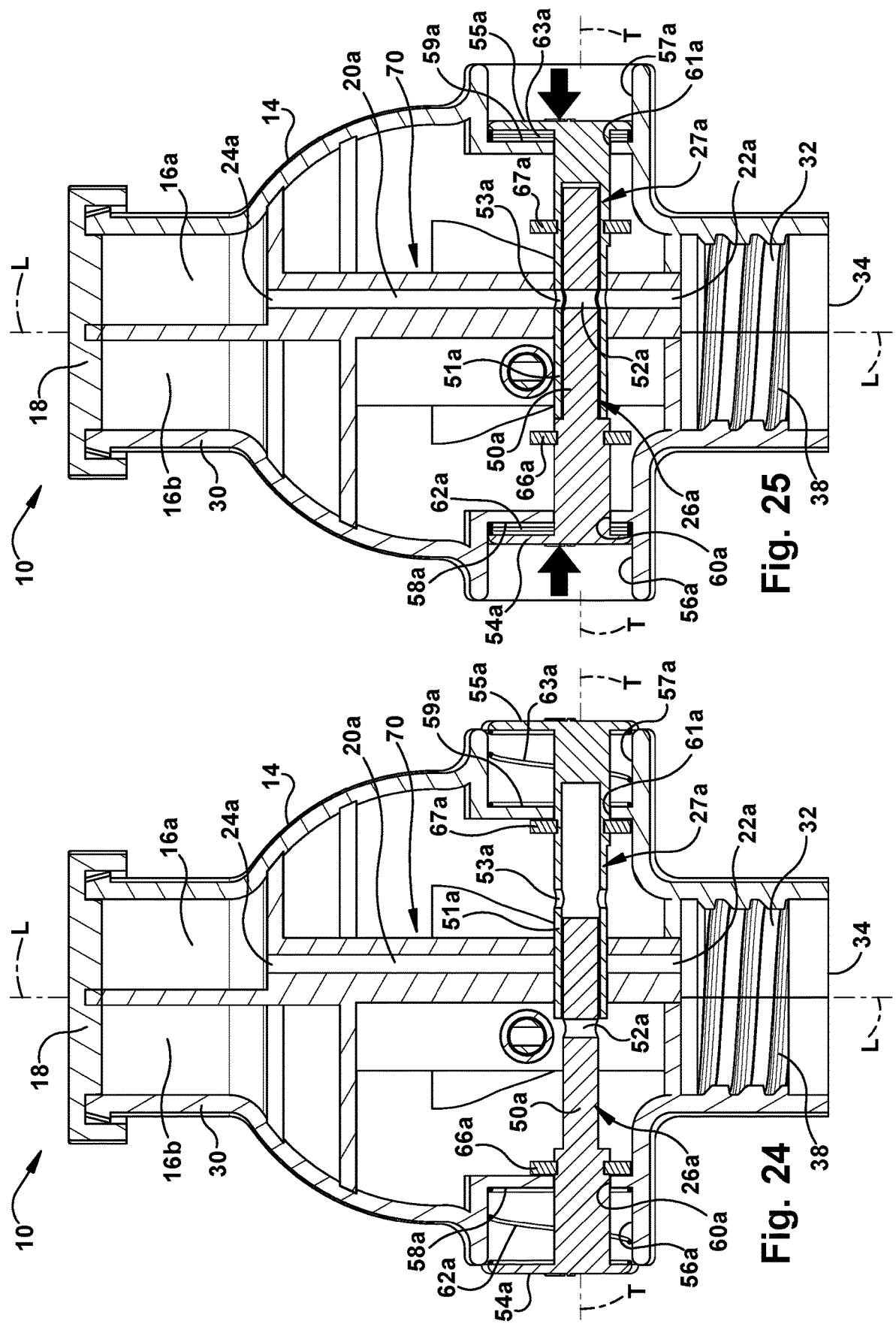

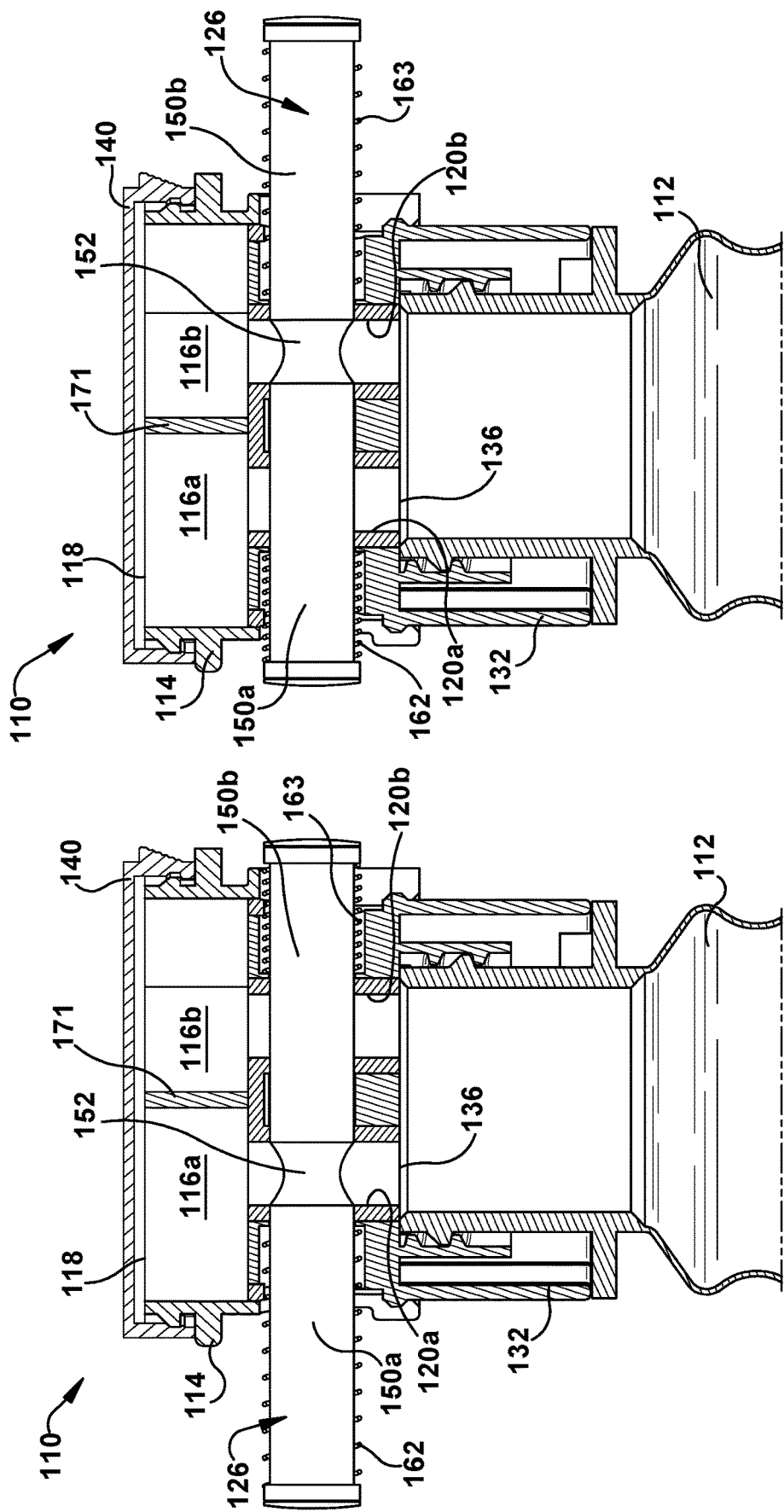

US 11,320,294 B2

MEASURED FLUID DISPENSER

RELATED APPLICATIONS

This application is a national phase of International Application No. PCT/US2019/026554 filed Apr. 9, 2019 and published in the English language, which claims priority to U.S. Provisional Application No. 62/655,333 filed Apr. 10, 2018, all of which are hereby incorporated herein by reference in their entireties.

TECHNICAL FIELD

The present disclosure relates generally to fluid dispensers, and more particularly to a fluid dispenser for measuring and dispensing fluid contained in a container.

BACKGROUND

Selectively measuring a desired amount of fluid for a specific use has been desirable for a long period of time. To date, there exists many ways to measure fluid. One such exemplary way is through the use of a measuring cup including delineated markers along the side of the cup to visually indicate to a user how much fluid is contained therein and dispensed from a bottle.

Measuring cups are ordinarily separable from containers containing medicine which leads to them often getting lost. Furthermore, the delineations on the measuring cups are very small and integrally formed into the plastic which may cause some users difficulty in visually seeing the demarcations on the cup which could result in an improper dosage of medicine.

SUMMARY

The present disclosure provides a fluid dispenser that is configured to measure and dispense a predefined quantity of fluid from a container with improved accuracy and ease.

More particularly, the fluid dispenser includes at least one measurement chamber that is configured to receive and contain a predefined quantity of the fluid from the container, in which at least one valve member of the dispenser is operable to selectively permit or restrict fluid flow to or from the chamber, thereby reducing or eliminating the need to visually and carefully measure the desired amount of fluid. Such a fluid dispenser enables a precise amount of the fluid, such as a liquid medicine or the like, to be measured in accordance with the prescribed volume of the chamber simply by filling the volume of the chamber with the fluid.

According to an aspect of the present disclosure, a fluid dispenser for measuring and dispensing a fluid contained in a container includes: a housing having a measurement chamber that defines a volume for receiving a predefined quantity of the fluid, the housing having an outlet opening in fluid communication with the measurement chamber for permitting the fluid contained in the measurement chamber to be dispensed therefrom; a fluid flow passage having an inlet configured to be in fluid communication with the fluid in the container when in use, and an outlet in fluid communication with the measurement chamber, the fluid flow passage being configured to permit fluid flow between the container and the measurement chamber when in use; and a valve member movable in the fluid flow passage between a first position and a second position; wherein in the first position the valve member is configured to open the fluid flow passage to permit fluid flow from the container to the measurement chamber to thereby allow the volume of the measurement chamber to fill with the predefined quantity of fluid; and wherein in the second position the valve member is configured to close the fluid flow passage to thereby restrict fluid flow from the container to the measurement chamber, and to restrict fluid flow from the measurement chamber back to the container to thereby isolate the predefined quantity of fluid to the measurement chamber.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 7 is a top plan view of the fluid dispenser.

FIG. 8 is a bottom plan view of the fluid dispenser.

FIG. 9 is an exploded front view of an exemplary housing of the fluid dispenser.

FIG. 10 is an interior perspective view of a left side of the housing of the fluid dispenser.

FIG. 11 is an interior perspective view of a right side of the housing of the fluid dispenser.

FIG. 12 is a perspective bottom view of an exemplary partition of the fluid dispenser.

FIG. 13 is a cross-sectional perspective view of the partition within the housing of the fluid dispenser.

FIG. 14 is a right plan view of the partition in FIG. 12.

FIG. 15 is a front plan view of the partition.

FIG. 16 is a bottom plan view of the partition.

FIG. 17 is a top plan view of the partition.

FIG. 18 is a perspective view of an exemplary valve member of the fluid dispenser.

FIG. 19 is a perspective view of another exemplary valve member of the fluid dispenser.

FIG. 20 is a side view of the valve members of FIG. 18 and FIG. 19 constituting an exemplary valve pair.

FIG. 21 is a perspective view of another exemplary valve member of the fluid dispenser.

FIG. 22 is a perspective view of another exemplary valve member of the fluid dispenser.

FIG. 23 is a side view of the valve members of FIG. 21 and FIG. 22 constituting another exemplary valve pair.

FIG. 24 is a cross-sectional front view of the exemplary fluid dispenser taken along the line 24-24 in FIG. 8, in which the fluid dispenser is shown in an exemplary closed state.

FIG. 25 is a cross-sectional front view of the exemplary fluid dispenser taken along the line 24-24 in FIG. 8, in which the fluid dispenser is shown in an exemplary open state.

FIG. 31 is a cross-sectional side view of the fluid dispenser and container, in which the fluid dispenser is shown in an exemplary first open state.

FIG. 32 is a cross-sectional side view of the fluid dispenser and container, in which the fluid dispenser is shown in an exemplary second open state.

DETAILED DESCRIPTION

Figure 1:
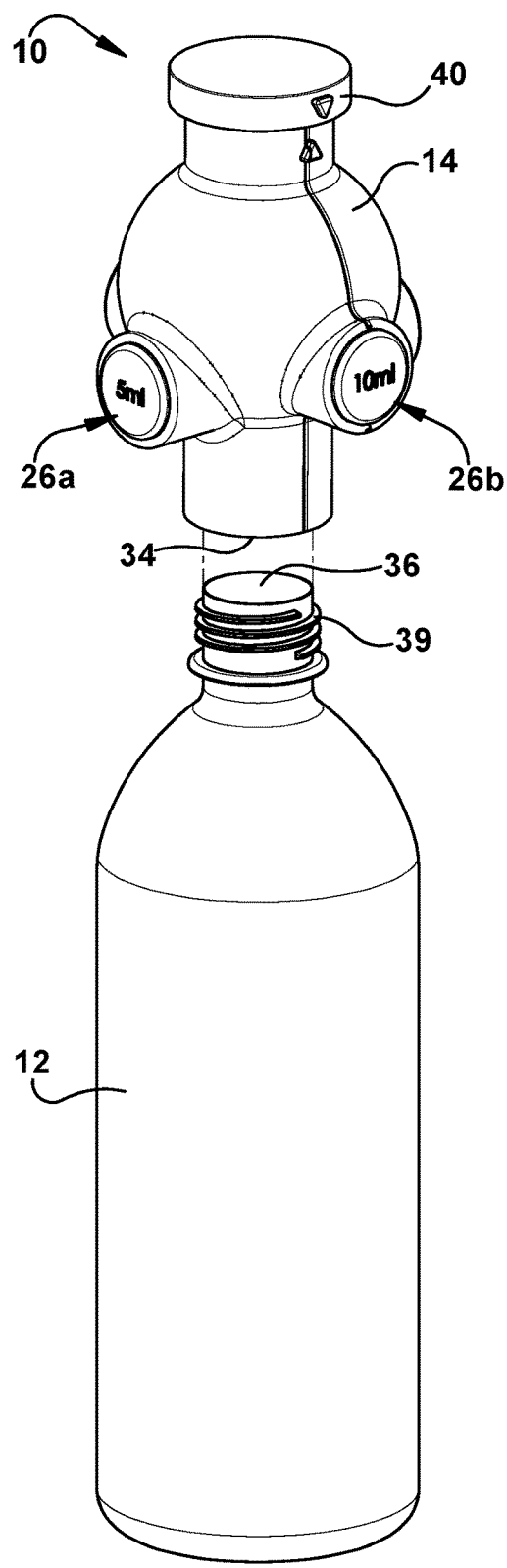
FIG. 1 is a perspective top view of an exemplary fluid dispenser and a container.
Figure 2:
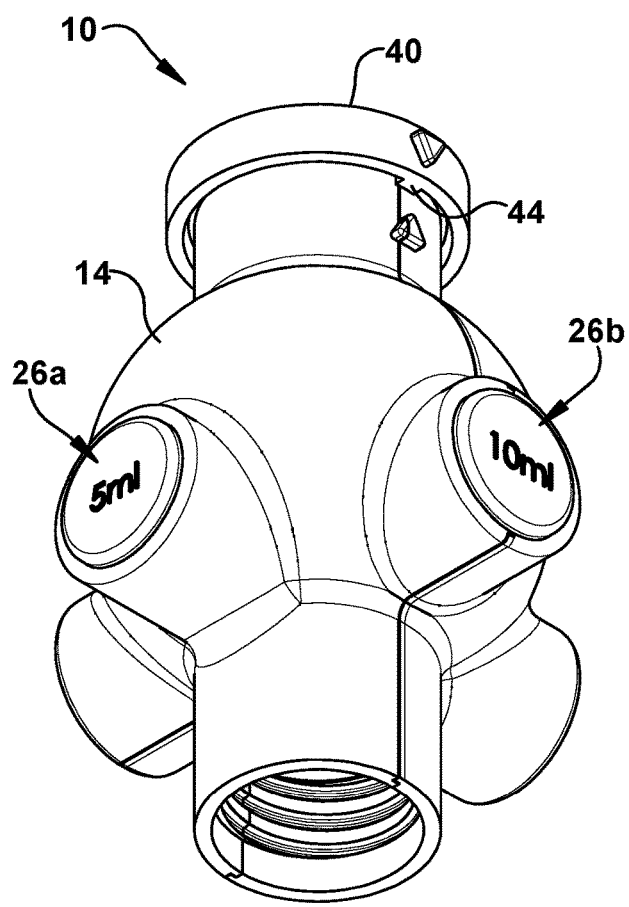
FIG. 2 is a perspective bottom view of the fluid dispenser.
Figure 4:
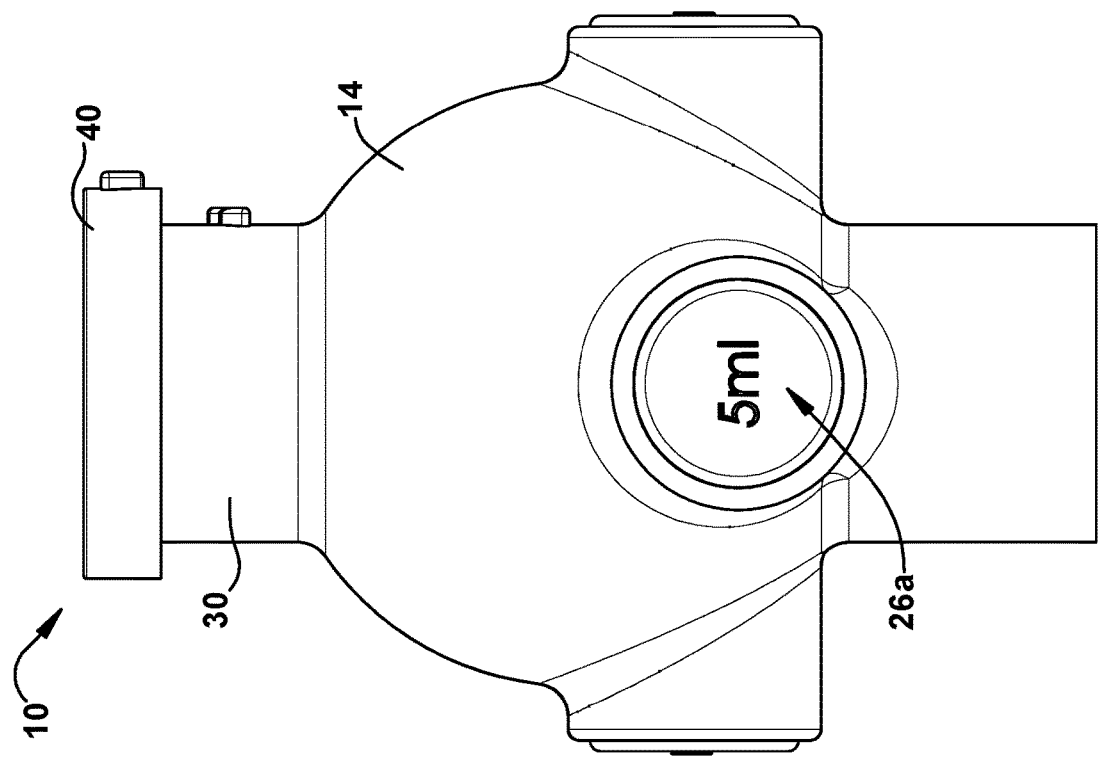
FIG. 4 is a left plan view of the fluid dispenser.

The principles and aspects of the present disclosure have particular application to fluid dispensers for use with liquid medications, and thus will be described below chiefly in this context. It is understood, however, that the principles and aspects of the present disclosure may be applicable for other applications for other types of fluids where it is desirable to measure and dispense fluid from a container with improved accuracy and ease.

FIGS. 1-27 show an exemplary fluid dispenser 10, or components thereof, for measuring and dispensing fluid contained in a container 12. In the illustrated embodiment, the fluid dispenser 10 includes a housing 14 having at least one internal measurement chamber 16a that defines a volume for measuring a predefined quantity of fluid. The housing 14 also includes an outlet opening 18 in fluid communication with the measurement chamber 16a for permitting the fluid contained in the measurement chamber 16a to be dispensed therefrom.

At least one fluid flow passage 20a is provided having an inlet 22a configured to be in fluid communication with the container 12 when in use, and an outlet 24a in fluid communication with the measurement chamber 16a, such that the fluid flow passage 20a permits fluid flow between the container 12 and the measurement chamber 16a.

At least one movable member, such as a valve member 26a, is provided to open and close the fluid flow passage 20a. The valve member 26a may be movable in the fluid flow passage 20a between a first position and a second position. As discussed in further detail below, in the first position, the valve member 26a is configured to open the fluid flow passage 20a to permit fluid flow from the container 12 to the measurement chamber 16a to thereby allow the volume of the measurement chamber 16a to fill with the predefined quantity of fluid. In the second position, the valve member 26a is configured to close the fluid flow passage 20a to thereby restrict fluid flow from the container 12 to the measurement chamber 16a, and also to restrict fluid flow from the measurement chamber 16a back to the container 12 to thereby isolate the predefined quantity of fluid to the measurement chamber 16a. This allows a precise amount of the fluid, such as a liquid medicine or the like, to be measured in accordance with the prescribed volume of the chamber simply by filling the entire volume of the chamber with the fluid.

In the illustrated embodiment, the housing 14 is a shell housing formed by one or more segments (as shown in FIGS. 9-11, for example). As shown, the housing 14 includes a spout portion 30, or projection, in which the spout portion 30 has the outlet opening 18 and forms at least a portion of the measurement chamber 16a. The housing 14 also may provide an inlet chamber 32 having an inlet opening 34 configured for fluid communication with a corresponding opening 36 of the container 12. As shown, the inlet chamber 32 is separated from the measurement chamber 16a, and the inlet 22a of the fluid flow passage 20a opens into the inlet chamber 32 to provide fluid communication between the inlet chamber 32 and measurement chamber 16a. The inlet chamber 32 is at least partially defined by internal surface(s) of the housing 14, in which these surfaces have threads 38 configured to thread onto corresponding threads 39 of the container 12. In exemplary embodiments, the threads 38 and/or bottom portion of the dispenser 10 may have a child-proofing feature, such as a push-down-and-turn or squeeze-and-turn type child lock, that cooperates with the container 12 to prevent children from accessing the contents of the container 12.

It is understood that although the housing 14 is shown as being coupleable to the container as a discrete unit, the housing 14 also may be integral and unitary with the container 12. In addition, the housing 14 may have one or more seals, such as elastomeric seals (not shown), at various locations of the housing 14, such as along the parting line between the two segments, to enhance sealability from the fluid as would be understood by those having ordinary skill in the art. Alternatively or additionally, the parting line between the two parts of the housing 14 may include a tongue-and-groove connector for connecting the two parts of the housing. In addition, although the housing 14 is shown as a shell housing formed by two segments, the housing may be formed as a single unitary structure, or the multiple parts of the housing 14 may be ultrasonically welded together at the parting line to enhance sealability and provide an integral housing structure.

As shown, the fluid dispenser further includes a closure 40 configured to close the outlet opening 18 of the housing 14 to contain the fluid within the measurement chamber 16a. In the illustrated embodiment, the closure 40 is a removable cap (also referenced with numeral 40). The cap 40 may be configured to cooperate with a portion of the housing 14 to provide a child-proof feature. For example, a collar portion 42 of the housing and a recessed portion 43 across the collar 42 may be provided, in which the cap 40 includes a corresponding abutment 44 that restricts removal of the cap when the abutment 44 engages the collar 42, and permits removal of the cap when the abutment 44 is aligned with the recess 43.

In exemplary embodiments, the fluid flow passage 20a extends in a longitudinal direction (L), and the valve member 26a is configured to be movable relative to the housing 14 in a direction transverse (T) to the longitudinal direction, such as perpendicular to the longitudinal direction. In exemplary embodiments, the fluid dispenser 10 includes a divider (such as partition 70, discussed further below) that is configured to separate the measurement chamber 16a from the container 12. The divider (e.g., partition 70) may define the fluid flow passage 20a and may cooperate with the valve member 26a to open or close the fluid flow passage 20a, as discussed below.

In the illustrated embodiment, the valve member 26a has a valve stem 50a having a reduced cross-sectional portion, such as a through-passage 52a or aperture extending transversely across the stem 50a, which may cooperate with the flow passage 20a to selectively open or close the flow passage 20a. It is understood that although the valve stem 50a and the through-passage 52a of the valve member 26a is shown for opening or closing the flow passage 20a, other suitable constructions of the valve member 26a may be utilized, as would be understood by those having ordinary skill in the art.

In the illustrated embodiment, as shown in FIG. 24 for example, the valve member 26a is configured such that at least one portion of the stem 50a sealingly closes the fluid flow passage 20a when the valve member 26a is in a closed position, in which the reduced cross-sectional portion (e.g., through-passage 52a) of the stem is out of alignment with the fluid flow passage. One or more seals, such as elastomeric seals (not shown), also may be provided in cooperation with the valve member 26a to further enhance such sealability. For example, such seals may be provided on the valve member 26a, or may be provided on the structure defining the fluid flow passage 20a, as would be understood by those having ordinary skill in the art.

In the illustrated embodiment, as shown in FIG. 25 for example, the valve member 26a is configured to open the fluid flow passage 20a when the reduced cross-sectional portion (e.g., through-passage 52a) of the stem 50a is at least partially aligned with the fluid flow passage 20a (such as in the illustrated first position). In exemplary embodiments, the flow passage 20a and/or the through-passage 52a of the valve member is sized to allow free flow of the fluid through the flow passage 20a. For example, the size of the flow passage 20a and/or through-passage 52a may be sized based upon a viscosity of the fluid or a range of viscosities of common fluids. In addition, the fluid dispenser 10 may have one or more venting features to prevent vacuum suction from restricting free flow of the fluid from the container into the chamber 16a.

In exemplary embodiments, the valve member 26a is a first valve member. The fluid dispenser 10a may further include a second valve member 27a that is configured to open and/or close the fluid flow passage 20a. Generally, the second valve member 27a may be configured to operate similarly to the first valve member 26a. For example, the second valve member 27a may have a valve stem 51a having a reduced cross-sectional portion, such as a through-passage 53a or aperture, extending transversely across the second stem 51a, in which at least one portion of the second stem 51a is configured to close the fluid flow passage 20a when the reduced cross-sectional portion (e.g., second through-passage 53a) is out of alignment with the fluid flow passage 20a (such as in the second position of the second valve member, as shown in FIG. 24 for example). In addition, the second valve member 27a is configured to open the fluid flow passage 20a when the when the reduced cross-sectional portion (e.g., second through-passage 53a) is at least partially aligned with the flow passage 20a (such as in the first position of the valve member, as shown in FIG. 25 for example).

The first valve member 26a and second valve member 27a may constitute a first valve pair that cooperate with each other to open and close the fluid flow passage 20a. For example, in the illustrated embodiment, the stem 51a of the second valve member 27a is configured as a guide sleeve having an internal bore 49a, and the stem 50a of the first valve member 26a is slidably disposed within the internal bore 49a. In such a configuration, either valve member 26a or 27a may close the fluid flow path 20a when the respective through-passage 52a or 53a is out of alignment with the fluid passage 20a. However, to open the fluid passage 20a with this configuration, both of the valve members 26a and 27a are moved to at least partially align their respective through-passages 52a and 53a through their stems 50a, 51a with the fluid flow passage 20a. Such a configuration may provide a child-proofing measure to further prevent fluid from filling the measurement chamber 16a.

In exemplary embodiments, the valve members 26a and 27a may each have an actuation portion 54a, 55a that allow a user to move the valve members. For example, the actuation portions 54a, 55a may be configured as buttons that are each depressible by a user toward the open position. In exemplary embodiments, the actuation portions 54a, 55a of the valve members may be circumferentially offset about the housing 14 to provide a child-proof measure. In the illustrated embodiment, the housing 14 has recessed portions 56a and 57a for receiving the corresponding actuation portions 54a, 55a, in which the actuation portions 54a, 55a may be the end portions of the valve members 26a and 27a. As shown, the recessed portions 56a, 57a may each have a recessed back wall 58a, 59a. The recessed walls 58a, 59a may each have a through-hole 60a, 61a for supporting and permitting movement of the valve stem 50a, 51a of the corresponding valve member. As shown, a biasing member 62a, 63a, such as a spring, may be provided to bias the corresponding valve members 26a, 27a toward the closed positions. For example, in the illustrated embodiment, the springs 62a and 63a are each interposed between the corresponding recessed walls 58a, 59a and the inner side of the actuation portions 54a, 55a to bias the valve members 26a, 27a outwardly toward their respective closed positions.

In exemplary embodiments, the fluid dispenser 10 may include one or more stops for restricting movement of the valve members 26a, 27a, in which these stop locations also may correspond with the open or closed positions. For example, the recessed back wall 58a, 59a may act as a stop (in cooperation with the springs 62a, 63a, for example) to position the valve members 26a, 27a at their respective open positions in which the through-passages 52a and 53a are aligned with the fluid flow passage 20a. Alternatively or additionally, the one or more of the valve members 26a, 27a also may have one or more stops for interacting with the other valve member 26a or 27a to restrict movement and/or position the valve members at their respective open positions. For example, in the illustrated embodiment, the first valve member 26a may have a shoulder portion 64a on the valve stem 50a that interfaces with the end 65a of the valve stem 51a of the second valve member 27a to act as a stop to the relative movement between valve members 26a, 27a, in which this interaction may be provided to align through-passages 52a and 53a with the fluid flow passage 20a. Alternatively or additionally, one or more additional stops may be provided that restrict movement of the valve members 26a, 27a beyond a certain point as the valve members move toward the second (closed) position (e.g., outwardly of the housing 14). For example, in the illustrated embodiment, each valve member 26a, 27a may have a protrusion 66a, 67a such as an O-ring within a recessed groove of the valve member, that is configured to engage a portion of the housing 14, such as an inner side of the corresponding recessed back wall 58a and 59a, to restrict such outward movement.

In exemplary embodiments, the fluid dispenser 10 includes more than one measurement chamber 16a. For example, as shown in the illustrated embodiment, the measurement chamber 16a may be a first measurement chamber, and the housing 14 includes a second measurement chamber 16b that also defines a volume for measuring a predefined quantity of fluid. In exemplary embodiments, the first measurement chamber 16a and/or the second measurement chamber 16b are configured to define a predetermined fixed volume. In the illustrated embodiment, the first measurement chamber 16a has a different volume than the second measurement chamber 16b, such as respective 5 mL and 10 mL volumes. As shown, the outlet opening 18 in the housing may be shared between the measurement chambers 16a and 16b, and the measurement chambers 16a and 16b may be separated by a divider wall 71 such that the fluid contained in each measurement chamber 16a, 16b is isolated from one another. It is understood that the fluid dispenser 10 could include more than two such measurement chambers, such as three, four, or more such chambers, some or all of which may have the same or different volumes.

The features corresponding to the second measurement chamber 16b may be substantially the same as the above-described features corresponding to the first measurement chamber 16a, and consequently the same reference numerals but replaced with a suffix "b" are used to denote structures corresponding to similar structures between the features of the measurement chambers 16a, 16b. As such, the foregoing description corresponding to the features of the measurement chamber 16a is equally applicable to the corresponding features of the measurement 16b, except as noted below.

Similarly to the features corresponding to the first measurement chamber 16a discussed above, the fluid dispenser 10 may further include a second fluid flow passage 20b having an inlet 22b in fluid communication with the container 12, and an outlet 24b in fluid communication with the second measurement chamber 16b. The inlet 22b of the fluid flow passage 20b may open into the inlet chamber 32 to provide fluid communication between the inlet chamber 32 and measurement chamber 16b. Except for sharing a common inlet chamber 32, the flow passage 20b may be separate from the flow passage 20a.

Figure 26:
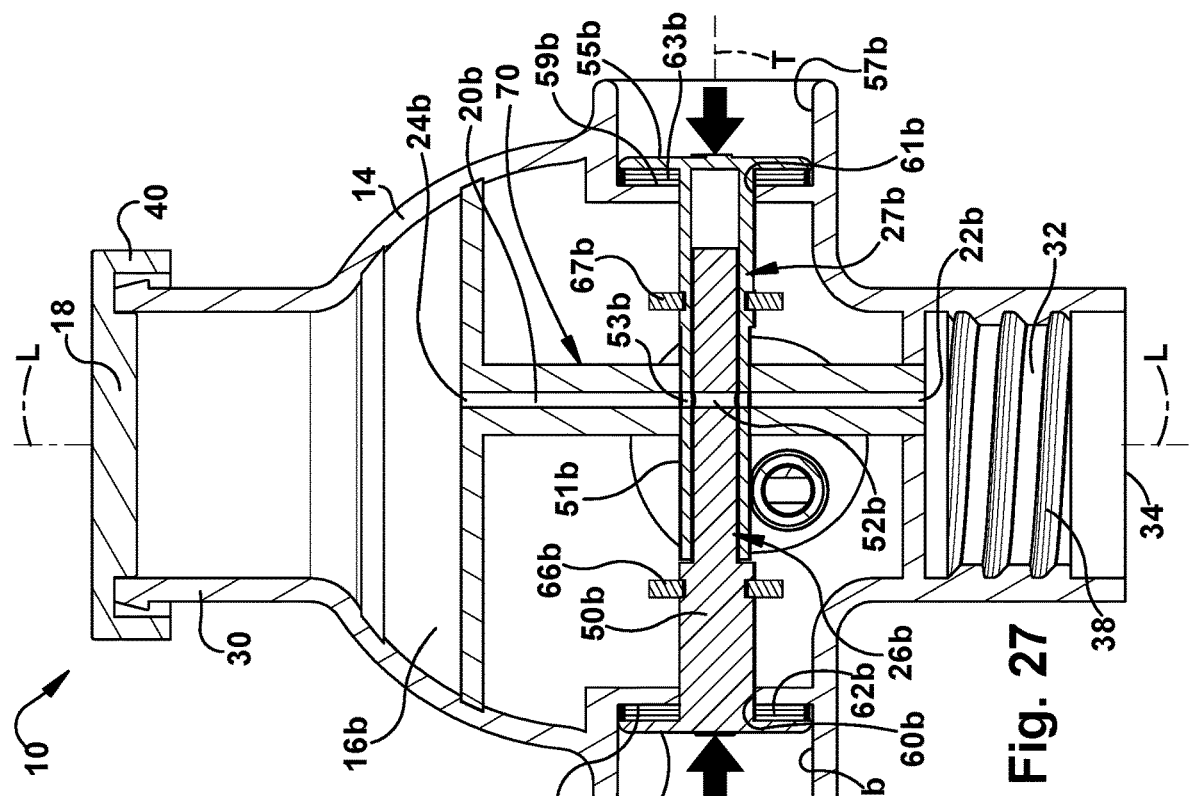
FIG. 26 is a cross-sectional side view of the exemplary fluid dispenser taken along the line 26-26 in FIG. 8, in which the fluid dispenser is shown in an exemplary closed state.
Figure 27:
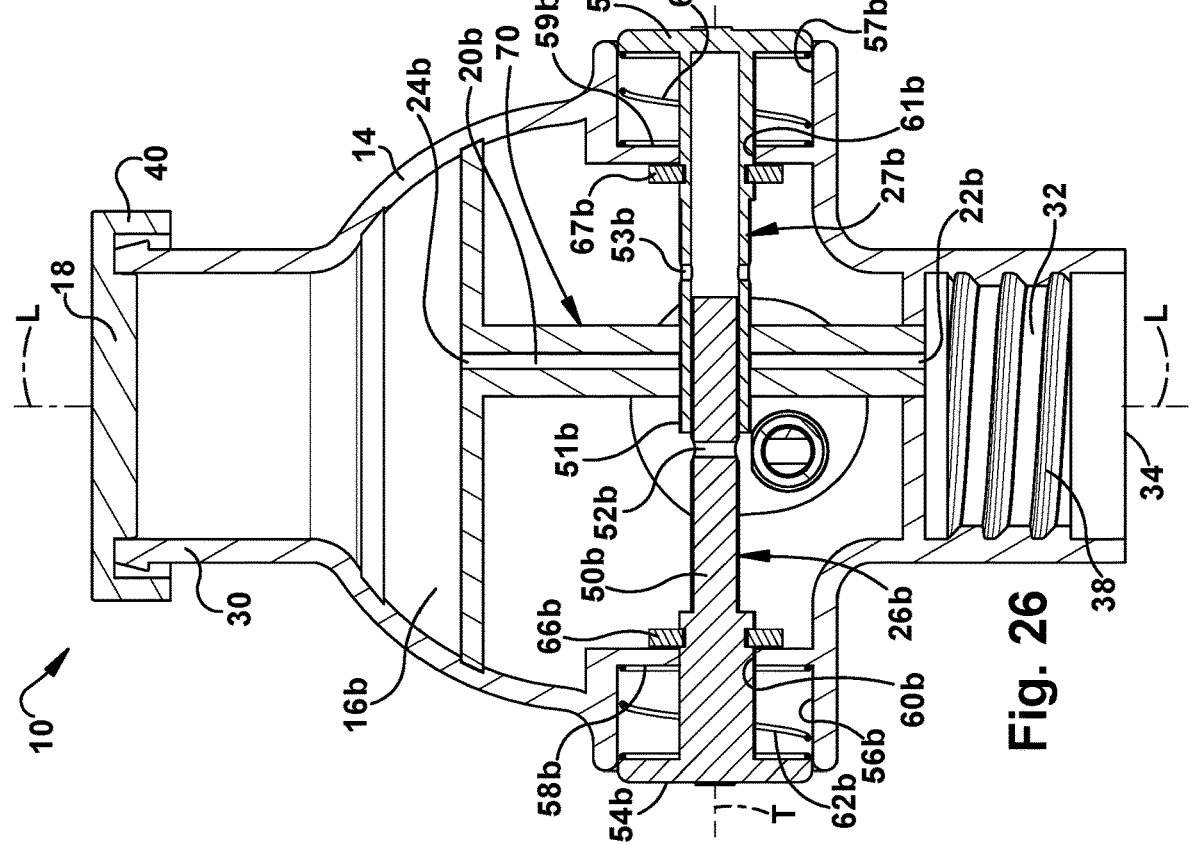
FIG. 27 is a cross-sectional side view of the exemplary fluid dispenser taken along the line 26-26 in FIG. 8, in which the fluid dispenser is shown in an exemplary open state.
Figure 29:
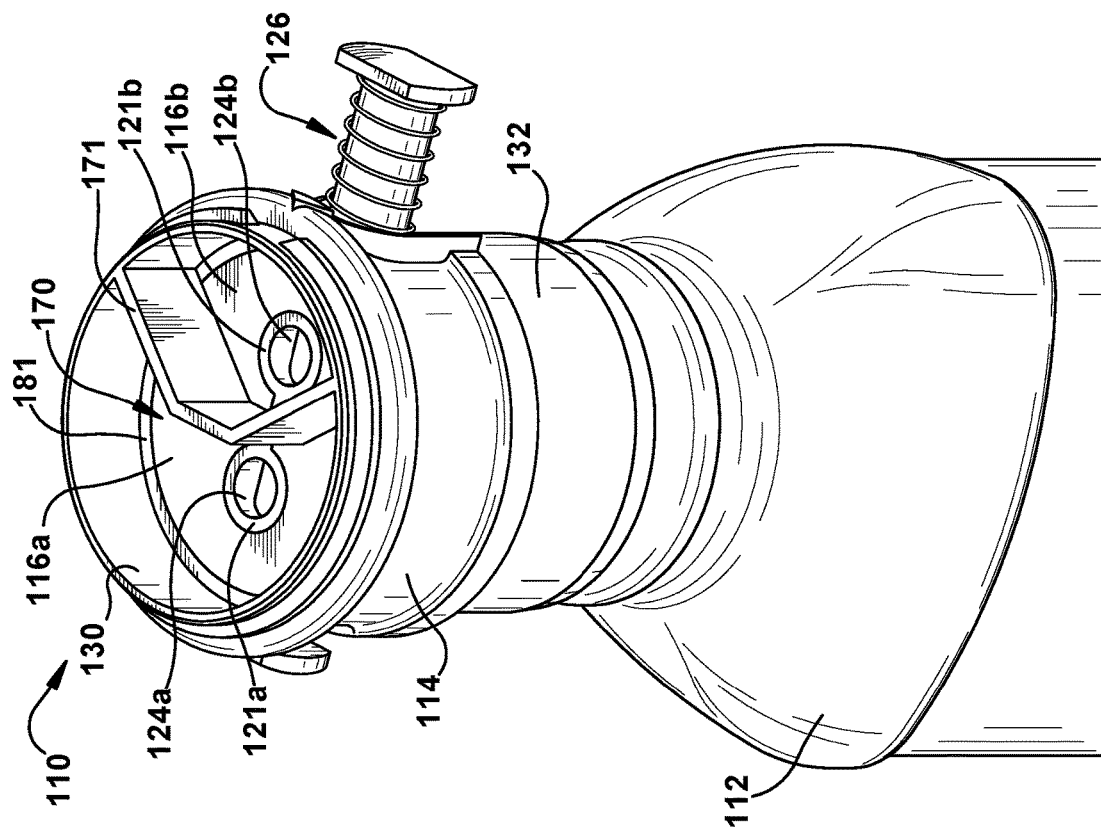
FIG. 29 is an enlarged perspective top view of the fluid dispenser and container with a closure of the fluid dispenser removed.
Figure 28:
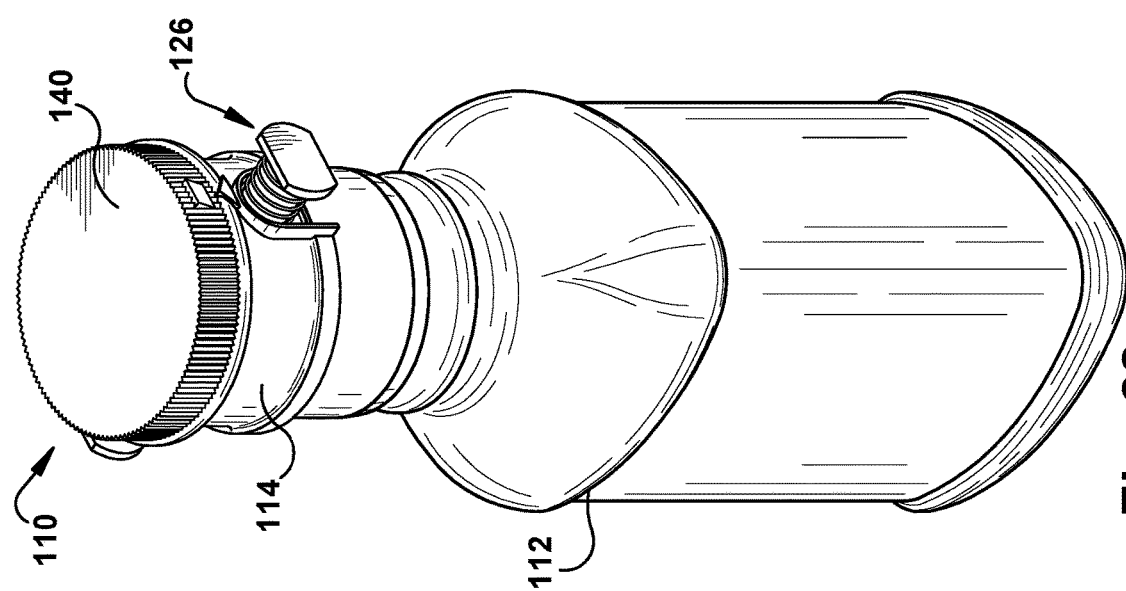
FIG. 28 is a perspective top view of another embodiment of an exemplary fluid dispenser and an exemplary container.

Similarly to the features discussed above, at least one movable member, such as a valve member 26b, is provided to open and close the fluid flow passage 20b. In a similar manner as the valve member 26a describe above, the valve member 26b may be movable in the fluid flow passage 20b between a first position, in which the fluid flow passage 20b is opened (as shown in FIG. 27 for example), and a second position, in which the fluid flow passage 20b is closed (as shown in FIG. 26 for example). Similarly to the first valve pair 26a, 27a described above, the valve member 26b may cooperate with another valve member 27b to constitute a second valve pair, in which the valve members 26b, 27b cooperate with each other to open and close the fluid flow passage 20b. As such, the valve member 26b may be a third valve member and the valve member 27b may be a fourth valve member of the fluid dispenser 10. Similarly to the first valve pair (26a, 27a), the second valve pair (26b, 27b) may have actuation portions 54b, 55b of the valve members circumferentially offset about the housing 14 to provide a child-proof measure. However, to avoid interference with the first valve pair (26a, 27a), the second valve pair (26b, 27b) may be circumferentially offset from the respective first valve pair (such as by 90-degrees), and may be axially offset at an elevation higher or lower than the first valve pair. One or more stops, among other features discussed above in connection with the first valve pair (26a, 27a), also may be provided for the second valve pair (26b, 27b). As shown, the first valve pair may have an indicator indicating the volume of the first measurement chamber (e.g., 5 mL), and the second valve pair may have an indicator indicating the volume of the second measurement chamber (e.g., 10 mL).

In exemplary embodiments, the housing 14 may include at least one partition 70, or divider, that is configured to at least partially define one or more of the measurement chambers 16a, 16b. In the illustrated embodiment, the partition 70 includes the upright divider wall 71 that separates the first measurement chamber 16a from the second measurement chamber 16b, and thus at least partially defines the respective chambers 16a, 16b. The partition 70 also has a first upper wall 72 that cooperates with an internal surface of the housing 14 to at least partially define the first measurement chamber 16a, and has a second upper wall 73 that cooperates with the internal surface of the housing 14 to at least partially define the second measurement chamber 16b. As shown, the first measurement chamber 16a has a smaller volume (e.g., 5 mL) than the volume of the second measurement chamber 16b (e.g., 10 mL), and the partition 70 is configured to cooperate with the housing 14 to define these different volumes. For example, in the illustrated embodiment, the first upper wall 72 and the second upper wall 73 are axially offset (at a different elevation) from each other to cooperate with the corresponding portions of the internal surface of the housing. Because of this axial offset, the respective walls 72, 73 engage different radial portions of the housing, and thus the walls 72, 73 also each have a radially outer periphery 74, 75 that is radially offset from the other.

The partition 70 may be discrete with respect to the housing 14, or may be formed integrally and unitary with the housing 14. The partition 70 also may be formed as a unitary structure, or may be formed of multiple segments. It is understood that the configuration of the partition 70 is merely exemplary, and different configurations of the partition 70 and housing 14 may be provided as understood by those skilled in the art. For example, in the illustrated embodiment, the partition 70 is fixed relative to the housing 14 to define a predetermined fixed volume of the measurement chamber(s) 16a, 16b, however, in other embodiments, the upper walls 72, 73, or other portions of the partition, may be adjustable to define a variable volume of the measurement chamber(s) 16a, 16b.

In exemplary embodiments, the partition 70 also may define at least a portion of the fluid flow passage(s) 20a and 20b for communicating fluid from the container 12 to the respective measurement chambers 16a, 16b. As such, the partition 70 also may have openings that define the inlet(s) 22a, 22b and outlet(s) 24a, 24b of the respective flow passage(s) 20a, 20b. In the illustrated embodiment, the partition 70 has through-hole(s) 76, 77 configured to receive the corresponding valve stem(s) (e.g., 50a, 51a and/or 50b, 51b) of the valve member(s) (e.g., 26a, 27a and/or 26b, 27b), such that the partition 70 supports a portion of the valve stem and facilitates slidable movement of the valve stem between first (open) and second (closed) positions, as discussed above. In this manner, the valve member(s) (e.g., 26a, 27a and/or 26b, 27b) cooperate with the partition 70 to fluidly open or sealably close the flow passage(s) 20a, 20b.

The partition 70 also may cooperate with the housing 14 to isolate and/or compartmentalize portions of the housing 14 from the fluid. For example, the partition 70 may have a lower wall or surface 76 that cooperates with a lower wall or surface 78 of the housing 14 to define at least a portion of the inlet chamber 32. As shown, the inlet(s) 22a, 22b of the fluid flow passage(s) 20a, 20b open into the inlet chamber 32 in fluid communication with a corresponding opening of the container 12, and the lower wall or surface(s) 76, 78 may cooperates with the inlet(s) 22a, 22b of the fluid flow passage(s) 20a, 20b to allow fluid flow through the fluid flow passage while blocking flow of the fluid in the internal chamber to other portions of the housing. Such a configuration may allow the major central region of the housing (e.g., the empty volume where the valve members move outside of the partition) to be free of fluid, thereby isolating those portions of the valve members and other regions of the housing that are outside of the fluid flow path. In exemplary embodiments, a seal such as an elastomeric seal (not shown) may be provided between the partition 70 and corresponding portions of the housing 14 to prevent undesirable leakage of the fluid into parts of the housing 14.

In an exemplary operation, a user may threadably couple the housing 14 to the container 12 having the fluid. The user may select a desired volume (e.g., 5 mL) and actuate the valve members 26a, 27a corresponding to that volume, in which the valve members move to their respective first positions to open the fluid flow path 20a. At this point, the closure 40 is secured to the housing to enclose the measurement chamber 16a having the predefined volume (e.g., 5 mL). Upon turning the bottle over, the fluid will flow out of the container 12 into the inlet opening 22a of the housing 14. The fluid flow passage 20b corresponding to the other measurement chamber 16b (e.g., 10 mL) is closed and fluid will not flow into that chamber 16b. On the other hand, with the other fluid flow passage 20a being opened by actuation of the valve members 26a, 27a, the fluid will flow through the flow passage 20a into the measurement chamber 16a to fill the chamber to the predefined volume (e.g., 5 mL). The user may then deactivate the valve members 26a, 27b by releasing them, in which the springs 62a, 63a will bias the valve members back to their respective closed positions, thereby closing the flow path 20a to contain and isolate the desired quantity of fluid to the measurement chamber 16a. This allows a precise amount of the fluid to be measured in accordance with the prescribed volume (e.g., 5 mL) of the chamber 16a by filling the entire volume of the chamber with the fluid. The user may then release the closure 40 from the housing 14 to dispense the desired quantity of fluid. The user may perform essentially the same steps for selecting the different quantity of fluid (e.g., 10 mL) for the measurement chamber 16b. Optionally, the user may perform the sequence of steps for selecting the first quantity sequentially, or in tandem, with selecting the second quantity for selecting a combined quantity of fluid (e.g., 15 mL).

Referring now to FIGS. 28-32, another exemplary embodiment of a fluid dispenser 110 is shown. The fluid dispenser 110 is substantially similar to the above-referenced fluid dispenser 10, and consequently the same reference numerals but indexed by 100 are used to denote structures corresponding to similar structures in the fluid dispensers 10, 110. In addition, the foregoing description of the fluid dispenser 10 is equally applicable to the fluid dispenser 110 except as noted below. It is also understood that the principles and aspects of the fluid dispensers 10, 110 may be substituted for one another or used in conjunction with one another where applicable.

Similarly to the above-described fluid dispenser 10, the fluid dispenser 110 includes a housing 114 having at least one internal measurement chamber 116a that defines a volume for measuring a predefined quantity of fluid. The housing 114 also includes an outlet opening 118 in fluid communication with the measurement chamber 116a for permitting the fluid contained in the measurement chamber 116a to be dispensed therefrom.

At least one fluid flow passage 120a is provided having an inlet 122a configured to be in fluid communication with the container 112 when in use, and an outlet 124a in fluid communication with the measurement chamber 116a, such that the fluid flow passage 120a permits fluid flow between the container 112 and the measurement chamber 116a

Figure 30:
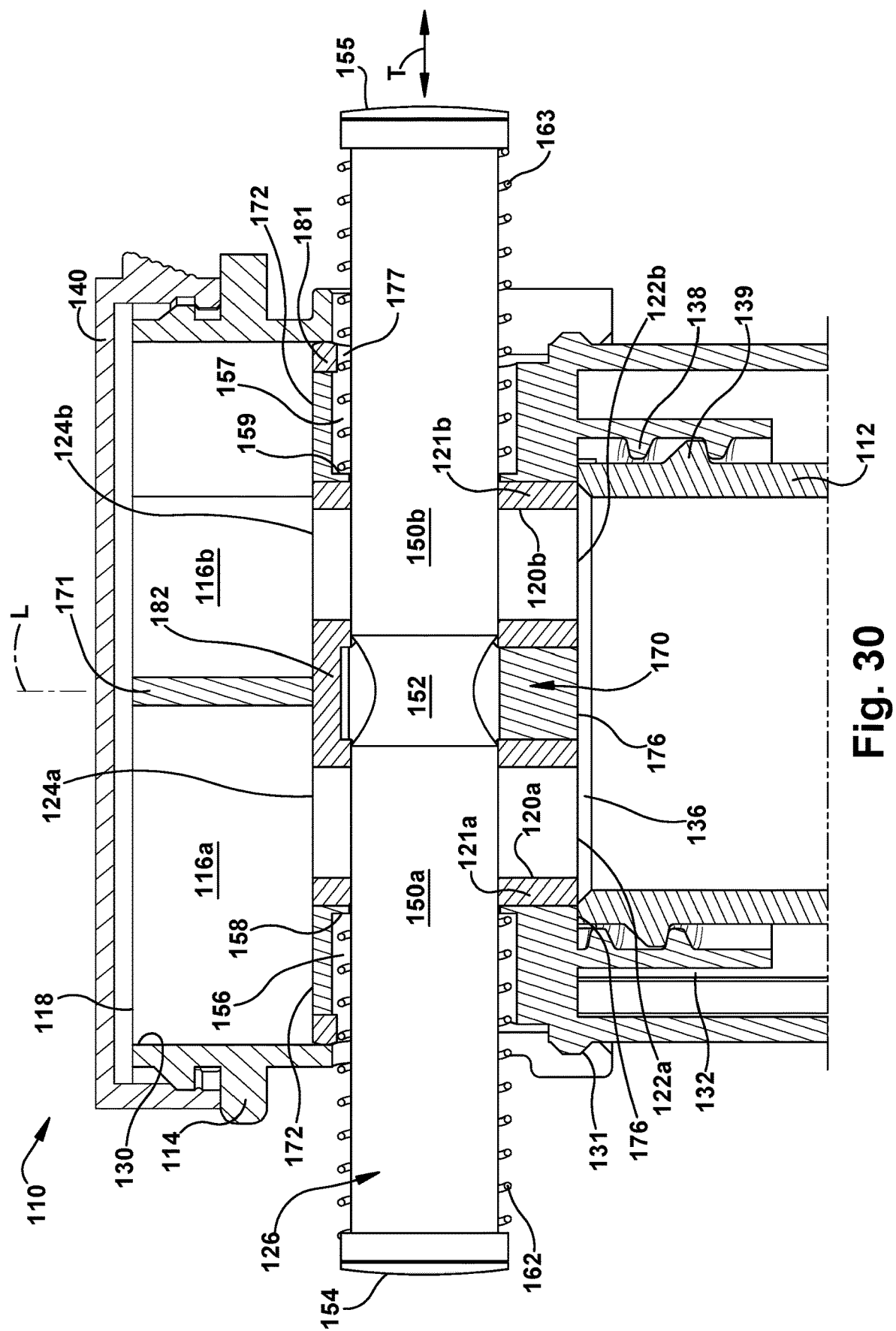
FIG. 30 is a cross-sectional side view of the fluid dispenser and container, in which the fluid dispenser is shown in an exemplary closed state.

At least one movable member, such as a valve member 126, is provided to open and close the fluid flow passage 120a. The valve member 126 may be movable in the fluid flow passage 120a between at least a first position and a second position. As discussed in further detail below, in the first position (as shown in FIG. 31 for example), the valve member 126 is configured to open the fluid flow passage 120a to permit fluid flow from the container 112 to the measurement chamber 116a to thereby allow the volume of the measurement chamber 116a to fill with a predefined quantity of fluid. In the second position (as shown in FIG. 30 for example), the valve member 126 is configured to close the fluid flow passage 120a to thereby restrict fluid flow from the container 112 to the measurement chamber 116a, and also to restrict fluid flow from the measurement chamber 116a back to the container 112 to thereby isolate the predefined quantity of fluid to the measurement chamber 116a. This allows a precise amount of the fluid, such as a liquid medicine or the like, to be measured in accordance with the prescribed volume of the chamber 116a simply by filling the entire volume of the chamber with the fluid.

As shown, the housing 114 includes an upper portion 130 having the outlet opening 118 and forms at least a portion of the measurement chamber 116a. The housing 114 also includes a lower portion 132 configured for fluid communication with a corresponding opening 136 of the container 112. The lower portion 132 includes internal threads 138 configured to thread onto corresponding threads 139 of the container 112. In exemplary embodiments, the threads 138 and/or bottom portion 132 of the dispenser 110 may have a child-proofing feature to prevent children from accessing the contents of the container 112. In the illustrated embodiment, the upper portion 130 of the housing 114 is a unitary part that is operably coupled to the lower portion 132, which is a unitary part, each of which may be formed by an injection molding process. In the illustrated embodiment, the upper part 130 is coupled to the lower part 132 via a snap-in collar connector 131, but could include threads or other suitable connector. It is understood, however, that the entire housing 114 may be made as a unitary construction, or may include additional parts or segments.

As shown, when the dispenser 110 is connected to the container 112, the inlet 122a of the fluid flow passage 120a opens to the lower portion 132 to provide fluid communication between the container 112 and measurement chamber 116a. For example, similarly to the dispenser 10, in the illustrated embodiment, the dispenser 110 is configured such that when the dispenser 110 is connected to the container 112, the inlet 122a opens directly into the opening 136 of the container 112, such as to prevent fluid from contaminating the threads 138.

As shown, the fluid dispenser 110 further includes a closure 140 configured to close the outlet opening 118 of the housing 114 to contain the fluid within the measurement chamber 116a. In the illustrated embodiment, the closure 140 is a removable cap 140, which may have a child-proof feature similarly to that described above for the fluid dispenser 10.

In exemplary embodiments, the fluid flow passage 120a extends in a longitudinal direction along a longitudinal axis (L) of the dispenser 110, and the valve member 126 is configured to be movable relative to the housing 114 in a direction transverse (T) to the longitudinal direction, such as perpendicular to the longitudinal direction. In exemplary embodiments, the fluid dispenser 110 includes a divider (such as partition 170, discussed further below) that is configured to separate the measurement chamber 116a from the container 112. The divider (e.g., partition 170) may define the fluid flow passage 120a and may cooperate with the valve member 126 to open or close the fluid flow passage 120a, as discussed below.

In the illustrated embodiment, the valve member 126 has a valve stem portion 150a having a reduced cross-sectional portion, such as groove 152 or notch extending transversely across the stem 150a, which may cooperate with the flow passage 120a to selectively open or close the flow passage 120a. It is understood that other suitable constructions of the valve member 126 may be utilized, as would be understood by those having ordinary skill in the art.

In the illustrated embodiment, as shown in FIG. 30 for example, the valve member 126 is configured such that at least one portion of the stem portion 150a sealingly closes the fluid flow passage 120a when the valve member 126 is in a closed position, in which the reduced cross-sectional portion (e.g., groove 152) of the valve member 126 is out of alignment with the fluid flow passage 120a. One or more seals, such as elastomeric seals, also may be provided in cooperation with the valve member 126 to further enhance such sealability. For example, in the illustrated embodiment, the walls 121a forming the flow passage 120a may be formed of an elastomeric material, such as a thermoplastic elastomer. Alternatively or additionally, such seals may be provided on the valve member 126, as would be understood by those having ordinary skill in the art.

In the illustrated embodiment, as shown in FIG. 31 for example, the valve member 126 is configured to open the fluid flow passage 120a when the reduced cross-sectional portion (e.g., groove 152) of the valve stem portion 150a is at least partially aligned with the fluid flow passage 120a. In exemplary embodiments, the flow passage 120a and/or the reduced cross-sectional portion (e.g., groove 152) of the valve member 126 is sized to allow free flow of the fluid through the flow passage 120a. In addition, the fluid dispenser 110 may have one or more venting features to prevent vacuum suction from restricting free flow of the fluid from the container into the chamber 116a.

In exemplary embodiments, the fluid dispenser 110 includes more than one measurement chamber 116a. For example, as shown in the illustrated embodiment, the measurement chamber 116a may be a first measurement chamber, and the housing 114 includes a second measurement chamber 116b that also defines a volume for measuring a predefined quantity of fluid. In exemplary embodiments, the first measurement chamber 116a and/or the second measurement chamber 116b are configured to define a predetermined fixed volume. In the illustrated embodiment, the first measurement chamber 116a has a different volume than the second measurement chamber 116b, such as respective 10 mL and 5 mL volumes. As shown, the outlet opening 118 in the housing may be shared between the measurement chambers 116a and 116b, and the measurement chambers 116a and 116b may be separated by a divider wall 171 such that the fluid contained in each measurement chamber 116a, 116b is isolated from one another. It is understood that the fluid dispenser 110 could include more than two such measurement chambers, such as three, four, or more such chambers, some or all of which may have the same or different volumes, in which the volumes may be 1 mL, 2 mL, 3 mL, 4 mL, 5 mL, 10 mL, 15 mL, 20 mL and the like.

The features corresponding to the second measurement chamber 116b may be substantially the same as the above-described features corresponding to the first measurement chamber 116a, and consequently the same reference numerals but replaced with a suffix "b" are used to denote structures corresponding to similar structures between the features of the measurement chambers 116a, 116b. As such, the foregoing description corresponding to the features of the measurement chamber 116a is equally applicable to the corresponding features of the measurement 116b, except as noted below.

Similarly to the features corresponding to the first measurement chamber 116a discussed above, the fluid dispenser 110 may further include a second fluid flow passage 120b having an inlet 122b in fluid communication with the container 112, and an outlet 124b in fluid communication with the second measurement chamber 116b. The inlet 122b of the fluid flow passage 120b may open toward the lower portion 132 of the housing 114, such as into the opening 136 of the container 112, to provide fluid communication between the container 112 and measurement chamber 116b. Except for sharing a common inlet portion (e.g., opening 136 of the container 112 and/or lower portion 132), the flow passage 120b may be separate from the flow passage 120a.

In exemplary embodiments, the housing 114 may include at least one partition 170, or divider, that is configured to at least partially define one or more of the measurement chambers 116a, 116b. In the illustrated embodiment, the partition 170 includes the upright divider wall 171 that separates the first measurement chamber 116a from the second measurement chamber 116b, and thus at least partially defines the respective chambers 116a, 116b. As shown, the upright divider wall 171 divides the upper portion 130 of the housing 114 into unequal segments, such that the first measurement chamber 116a has a larger volume (e.g., 10 mL) than the volume of the second measurement chamber 116b (e.g., 5 mL). In the illustrated embodiment, an upper wall 172 of the partition 170 that defines the bottom of the respective chambers 116a, 116b extends along the same elevational plane across the upper portion 130.

The partition 170 may be discrete with respect to the housing 14, or may be formed integrally and unitary with the housing 114. The partition 170 also may be formed as a unitary structure, or may be formed of multiple segments. In the illustrated embodiment, the partition 170 is formed as part of the lower portion 132 of the housing 114. It is understood that the configuration of the partition 170 is merely exemplary, and different configurations of the partition 170 and housing 114 may be provided as understood by those skilled in the art. For example, in the illustrated embodiment, the partition 170 is fixed relative to the housing 114 to define a predetermined fixed volume of the measurement chamber(s) 116a, 116b, however, in other embodiments, at least a segment of the upright divider wall 171 may be adjustable, such as via a hinge (e.g., living hinge), to define a variable volume of the measurement chamber(s) 116a, 116b.

The partition 170 also may cooperate with the housing 114 to isolate and/or compartmentalize portions of the housing 114 from the fluid. For example, the partition 170 has a lower wall or surface 176 that extends across the lower portion 132 of the housing to seal the opening of the container 112. As shown, the inlet(s) 122a, 122b of the fluid flow passage(s) 120a, 120b open through the lower surface 176 to provide fluid communication with the container 112. In exemplary embodiments, the partition 170 may include one or more seals 180, 181 or sealed portions, such as an elastomeric seal (e.g., thermoplastic elastomer) to prevent undesirable leakage of the fluid into parts of the housing 114.

In the illustrated embodiment, the valve member 126 is movable from the second (closed) position (as shown in FIG. 30 for example) to a third position (as shown in FIG. 32 for example), in which the valve member 126 is configured to open the fluid flow passage 120b to permit fluid flow from the container 112 to the measurement chamber 116b to thereby allow the volume of the measurement chamber 116b to fill with the predefined quantity of fluid.

Similarly to the operation for opening and closing the flow passage 120a discussed above, the valve member 126 is configured such that at least one portion of the stem 150b sealingly closes the fluid flow passage 120b when the valve member 126 is in the closed position (as shown in FIG. 30 for example), in which the reduced cross-sectional portion (e.g., groove 152a) of the valve member 126 is out of alignment with the fluid flow passage 120b. Similarly to the flow passage 120b, in the illustrated embodiment, the walls 121b forming the flow passage 120b may be formed of an elastomeric material, such as a thermoplastic elastomer. Alternatively or additionally, such seals may be provided on the stem portion 150b of the valve member 126.

Also similarly to the description of the first open position of the valve member 126 described above, the valve member 126 is configured to open the fluid flow passage 120b when the reduced cross-sectional portion (e.g., groove 152) of the valve stem portion 150b is at least partially aligned with the fluid flow passage 120b (as shown in FIG. 32, for example). Similarly to the description above, in exemplary embodiments, the flow passage 120b and/or the reduced cross-sectional portion (e.g., groove 152) of the valve member 126 is sized to allow free flow of the fluid through the flow passage 120b.

In exemplary embodiments, the dispenser 110 includes only a single valve member 126 that is movable relative to the housing 114 to selectively open and close either of the first and second flow passages 120a, 120b to fill the first and/or second measurement chambers 116a, 116b. As shown, when the valve member 126 is in the exemplary first (open) position (as shown in FIG. 31 for example), the valve member 126 is configured to open the first flow passage 120a (such as via reduced cross-sectional area portion 152) and also is configured to close the second flow passage 120b (such as via the stem portion 150b). When the valve member is in the exemplary third (open) position (as shown in FIG. 32 for example), the valve member 126 is configured to open the second flow passage 120b (such as via reduced cross-sectional area portion 152) and also is configured to close the first flow passage 120a (such as via the stem portion 150a). When the valve member is in the exemplary second (closed) position, which may be between the first and third position (as shown in FIG. 30 for example), the valve member 126 is configured to close both the first and second flow passages 120a, 120b (such as via respective stem portions 150a, 150b).

In exemplary embodiments, the partition 170 defines the fluid flow passage(s) 120a and 120b for communicating fluid from the container 112 to the respective measurement chambers 116a, 116b. In this manner, the partition 170 may have openings that define the inlet(s) 122a, 122b and outlet(s) 124a, 124b of the respective flow passage(s) 120a, 120b. For example, where the walls 121a, 121b forming the fluid passages 120a, 120b are formed from a seal material (e.g., thermoplastic elastomer), these walls 121a, 121b may be considered to constitute a part of the partition 170. In the illustrated embodiment, the walls 121a, 121b and the seal portion 182 may be formed as a single part made of the resilient material (e.g., thermoplastic elastomer) that is inserted into the lower portion 132 of the housing 114 (which may be formed of a rigid, e.g., polypropylene, polyethylene, polycarbonate, ABS, or the like material) to thereby form a portion of the partition 170.

As shown in the illustrated embodiment, the partition 170 and/or housing 114 (e.g., upper portion 130 and/or lower portion 132) also includes through-hole(s) 176, 177 configured to receive the corresponding valve stem portions 150a, 150b on the opposite sides of the valve stem 126. In this manner, the partition 170 and/or housing 114 supports the respective portions of the valve stem 126 and facilitates slidable movement of the valve stem 126 between first (open), second (closed), and third (open) positions, as discussed above.

In exemplary embodiments, the valve member 126 has actuation portions 154, 155 on its opposite ends that allow a user to move the valve member 126. For example, the actuation portions 154, 155 may be configured as buttons that are each depressible by a user toward the open position. In the illustrated embodiment, the housing 114 has recessed portions 156 and 157 for receiving the corresponding actuation portions 154, 155. As shown, the recessed portions 156, 157 may each have a recessed back wall 158, 159, each of which may have a through-hole, for supporting and permitting movement of the valve stem portions 150a, 150b of the valve member 126.

As shown, the fluid dispenser 110 may include one or more biasing members 162, 163, such as a spring, to bias the valve member 126 toward the closed position (as shown in FIG. 30, for example). In the illustrated embodiment, the springs 162 and 163 are on opposite sides of the valve member 126, and are each interposed between the corresponding recessed walls 158, 159 and the inner side of the actuation portions 154, 155 to bias the valve member 126 to the closed position. In this manner, the biasing members 162, 163 are configured to provide equal biasing force to automatically center the valve member 126 at the closed (second) position between the opposite (first and third) open positions.

In exemplary embodiments, the fluid dispenser 110 may include one or more stops for restricting movement of the valve member 126, in which these stop locations also may correspond with the (first and third) open positions. For example, the recessed back walls 158, 159 may act as a stop (optionally in cooperation with the full compression of the springs 162, 163, for example) to position the valve member 126 at the respective (first and third) open positions in which the reduced cross-sectional area (e.g., groove 152) is aligned with the fluid flow passages 120a, 120b to open the flow passages.

In an exemplary operation of the fluid dispenser 110, a user may threadably couple the housing 114 to the container 112 having the fluid. The user may select a desired volume (e.g., 10 mL) and actuate the valve member 126 in a first direction toward the first open position (e.g., as shown in FIG. 31) corresponding to that volume, in which the valve member 126 moves to the first open position to open the fluid flow path 120a. At this point, the closure 140 is secured to the housing 114 to enclose the measurement chamber 116a having the predefined volume (e.g., 10 mL). Upon turning the container 112 over, the fluid will flow out of the container 112 into the inlet opening 122a. The fluid flow passage 120b corresponding to the other measurement chamber 116b (e.g., 5 mL) is closed by virtue of the position of the valve member 126 and fluid will not flow into that chamber 116b. On the other hand, with the other fluid flow passage 120a being opened by actuation of the valve member 126, the fluid will flow through the flow passage 120*a* into the measurement chamber 116*a* to fill the chamber to the predefined volume (e.g., 10 mL). The user may then deactivate the valve member 126 by releasing it, in which the biasing members 162, 163 will bias the valve member 126 back to its center (closed) position (as shown in FIG. 30 for example), thereby closing the flow path 120*a* to contain and isolate the desired quantity of fluid to the measurement chamber 116*a*. This allows a precise amount of the fluid to be measured in accordance with the prescribed volume (e.g., 10 mL) of the chamber 116*a* by filling the entire volume of the chamber with the fluid. The user may then release the closure 140 from the housing 114 to dispense the desired quantity of fluid. The user may perform essentially the same steps for selecting the different quantity of fluid (e.g., 5 mL) for the measurement chamber 116*b* by moving the valve member 126 in the opposite direction to the other (third) open position (as shown in FIG. 32 for example). Optionally, the user may perform the sequence of steps for selecting the first quantity in chamber 116*a* sequentially with selecting the second quantity in chamber 116*b* for selecting a combined quantity of fluid (e.g., 15 mL).

While one or more preferred forms of the exemplary fluid dispenser has been described above, it should be apparent to those skilled in the art that other fluid dispenser designs could also be used with the present invention. The invention is not limited to any particular fluid dispenser design, but rather is appropriate for a wide variety of fluid dispensers. For example, other suitable forms of the housing, measurement chamber(s), fluid flow passage(s), valve member(s), etc., and/or the interaction thereof are possible, as would be understood by those having ordinary skill in the art. In addition, although the measurement chamber(s) are shown as having fixed predetermined volume(s) to provide a predefined quantity of fluid, it is also understood that the volume(s) provided by the measurement chamber(s) also could be variable and preselected to provide the predefined quantity of fluid if desired for particular applications.

According to an aspect of the present disclosure, a fluid dispenser is provided that is configured to measure and dispense a predefined quantity of fluid from a container with improved accuracy and ease.

According to another aspect of the present disclosure, a fluid dispenser is provided that includes at least one measurement chamber that is configured to receive and contain a predefined quantity of the fluid from the container, in which at least one valve member of the dispenser is operable to selectively permit or restrict fluid flow to or from the chamber, thereby reducing or eliminating the need to visually and carefully measure the desired amount of fluid.

According to another aspect of the present disclosure, a fluid dispenser is provided for measuring and dispensing a fluid contained in a container, the fluid dispenser including: a housing having a measurement chamber that defines a volume for receiving a predefined quantity of the fluid, and an outlet opening in fluid communication with the measurement chamber for permitting the fluid contained in the measurement chamber to be dispensed therefrom; a fluid flow passage having an inlet configured to be in fluid communication with the fluid in the container when in use, and an outlet in fluid communication with the measurement chamber, the fluid flow passage being configured to permit fluid flow between the container and the measurement chamber when in use; and a valve member movable in the fluid flow passage between a first position and a second position; wherein in the first position the valve member is configured to open the fluid flow passage to permit fluid flow from the container to the measurement chamber to thereby allow the volume of the measurement chamber to fill with the predefined quantity of fluid; and wherein in the second position the valve member is configured to close the fluid flow passage to thereby restrict fluid flow from the container to the measurement chamber, and to restrict fluid flow from the measurement chamber back to the container to thereby isolate the predefined quantity of fluid to the measurement chamber.

Embodiments according to the present disclosure may include one or more of the foregoing aspects, separately or in any combination, which may be combined with one or more of the following additional features, which may be included separately or in any combination.

In some embodiments, the fluid flow passage extends in a longitudinal direction, and wherein the valve member is movable relative to the housing in a direction transverse to the longitudinal direction, such as perpendicular to the longitudinal direction.

In some embodiments, the valve member has a reduced cross-sectional area portion, such as a through-passage extending transversely across a stem of the valve member, wherein at lease another portion of the valve member is configured to close the fluid flow passage when the reduced cross-sectional area portion is out of alignment with the fluid flow passage (such as in the second position), and wherein the valve member is configured to open the fluid flow passage when the reduced cross-sectional area portion is at least partially aligned with the fluid flow passage (such as in the first position).

In some embodiments, the fluid flow passage and the reduced cross-sectional area portion of the valve member are sized to allow passage of the fluid based upon a viscosity of the fluid.

In some embodiments, the valve member is a first valve member, the fluid dispenser further comprising a second valve member that cooperates with the first valve member to open the fluid flow passage.

In some embodiments, the second valve member is movable in the fluid flow passage between a first position and a second position; wherein the second valve member has a second reduced cross-sectional area portion, such as a second through-passage extending transversely across the second stem, wherein at least another portion of the second valve member is configured to close the fluid flow passage when the second reduced cross-sectional area portion is out of alignment with the fluid flow passage (such as in the second position of the second valve member), and wherein the second valve member is configured to cooperate with the first valve member to open the fluid flow passage when the second reduced cross-sectional area portion of the second valve member is at least partially aligned with both the reduced cross-sectional area portion of the first valve member and the fluid flow passage (such as in the first position of the second valve member).

In some embodiments, a stem of the second valve member is configured as a guide sleeve, and wherein a stem of the first valve member is slidably disposed within the guide sleeve.

In some embodiments, the first and second valve members are each spring-biased toward the closed position, and are each depressible by a user toward the open position.

In some embodiments, the first and second valve members are circumferentially offset about the housing.

In some embodiments, the housing has a recessed portion for receiving an end portion of the valve member, the recessed portion have a recessed wall that acts as a stop to the movement of the valve member, more particularly in which the location of the stop corresponds to the first position to open the fluid flow path.

In some embodiments, the recessed wall has a through-hole for supporting and permitting movement of a valve stem of the valve member.

In some embodiments, a biasing member, such as a spring is disposed within the recessed portion to bias the valve member toward the closed position.

In some embodiments, the measurement chamber is a first measurement chamber having a first volume, the housing having a second measurement chamber that defines a volume for measuring a predefined quantity of fluid.

In some embodiments, the outlet opening in the housing is shared between the second measurement chamber and the first measurement chamber, in which the first and second measurement chambers are separated by a partition such that the fluid contained in each measurement chamber is isolated from one another.

In some embodiments, the first measurement chamber has a different volume than the second measurement chamber.

In some embodiments, the fluid dispenser further includes a second fluid flow passage having an inlet configured to be in fluid communication with the container when in use, and an outlet in fluid communication with the second measurement chamber, the fluid flow passage being configured to permit fluid flow between the container and the second measurement chamber when in use; and another (e.g., third) valve member movable in the second fluid flow passage between a first position and a second position; wherein in the first position the other valve member is configured to open the second fluid flow passage to permit fluid flow from the container to the second measurement chamber to thereby allow the volume of the second measurement chamber to fill with a predefined quantity of fluid; and wherein in the second position the other valve member is configured to close the second fluid flow passage to thereby restrict fluid flow from the container to the second measurement chamber, and to restrict fluid flow from the second measurement chamber back to the container to thereby isolate the predefined quantity of fluid to the second measurement chamber.

In some embodiments, the fluid dispenser includes the first and second valve members, in which the first and second valve members constitute a first valve pair that cooperate to open and close the first fluid flow passage; and wherein the other valve member is a third valve member, the fluid dispenser further including a fourth valve member, in which the third and fourth valve members constitute a second valve pair that cooperate to open and close the second fluid flow passage.

In some embodiments, the first valve pair has an indicator indicating the volume of the first measurement chamber, and the second valve pair has an indicator indicating the volume of the second measurement chamber.

In some embodiments, the housing has a partition that at least partially defines the measurement chamber.

In some embodiments, the partition defines the fluid flow passage and separates the measurement chamber from the inlet opening.

In some embodiments, the partition is discrete from the housing, or is integral with the housing.

In some embodiments, the partition is fixed to define a predetermined fixed volume of the measurement chamber for providing the predefined quantity of fluid, or wherein the partition is adjustable to define a variable volume of the measurement chamber for providing the predefined quantity of fluid.

In some embodiments, the partition cooperates with the housing to isolate portions of the valve member outside of the fluid flow path and/or compartmentalize other portions of the housing from the fluid.

In some embodiments, the partition has a lower wall that cooperates with the housing to define at least a lower portion of the housing that is connectable to the container, wherein the inlet of the fluid flow passage is configured to open to an opening of the container when in use, and wherein the lower wall cooperates with the inlet of the fluid flow passage to allow fluid flow through the fluid flow passage while blocking flow of the fluid in the container to other portions of the housing.

In some embodiments, the partition has a through-hole configured to receive a valve stem of the valve member, such that the partition supports the valve stem and permits the valve stem to slidably move between first and second positions.

In some embodiments, the partition has a first upper wall that cooperates with an internal surface of the housing to at least partially define the first measurement chamber, and has a second upper wall that cooperates with the internal surface of the housing to at least partially define the second measurement chamber.

In some embodiments, the first measurement chamber has a different volume than the second measurement chamber.

In some embodiments, the first upper wall and the second upper wall are axially and radially offset from each other to cooperate with the corresponding portions of the internal surface of the housing.

In some embodiments, the housing includes a spout portion, the spout portion having the outlet opening and forming at least a portion of the measurement chamber.

In some embodiments, the measurement chamber is a first measurement chamber having a first volume, the housing having a second measurement chamber that defines a second volume for measuring a second predefined quantity of fluid; wherein the fluid flow passage is a first fluid flow passage, the fluid dispenser further including a second fluid flow passage having a second inlet configured to be in fluid communication with the container when in use, and a second outlet in fluid communication with the second measurement chamber, the second fluid flow passage being configured to permit fluid flow between the container and the second measurement chamber when in use; wherein the valve member is movable in the fluid flow passage between the first and second position to open and close the first fluid flow passage; and wherein the valve member is movable to a third position, in which the valve member is configured to open the second fluid flow passage to permit fluid flow from the container to the second measurement chamber to thereby allow the second volume of the measurement chamber to fill with the second predefined quantity of fluid.

In some embodiments, when the valve member is in the first position, the first fluid flow passage is opened and the second fluid flow passage is closed.

In some embodiments, when the valve member is in the second position, both the first fluid flow passage and the second fluid flow passage are closed.

In some embodiments, when the valve member is in the third position, the second fluid flow passage is opened and the first fluid flow passage is closed.

In some embodiments, the fluid dispenser includes one or more biasing members that bias the valve member to the second position in which both the first and second fluid flow passages are closed.

In some embodiments, the valve member includes two opposing biasing members on opposite sides of the valve member; wherein the two opposing biasing members bias the valve member to the second position which is a center position of the valve member between the first and third positions.

In some embodiments, the valve member for opening and closing the first and second fluid flow passages is a single valve member.

In some embodiments, the housing has a partition that at least partially defines the first and second measurement chambers.

In some embodiments, the partition is fixed relative to the housing to define respective predetermined fixed volumes of the first and second measurement chambers for providing the predefined first and second quantities of fluid.

In some embodiments, the partition is adjustable to define respective variable volumes of the first and second measurement chambers for providing the predefined first and second quantities of fluid.

In some embodiments, the dispenser further includes a closure configured to close the outlet opening of the housing to contain the fluid therein.

In some embodiments, the closure is a cap.

In some embodiments, the cap is a removable cap that cooperates with a portion of the housing to provide a child-proof feature, such as a collar portion of the housing and a recessed portion across the collar, the cap having a corresponding abutment that restricts removal of the cap when the abutment engages the collar, and permits removal of the cap when the abutment is aligned with the recess.

In some embodiments, the inlet of the fluid flow passage is configured to open to the container when the dispenser is connected to the container.

In some embodiments, a lower portion of the housing has internal threads configured to thread onto corresponding threads of the container.

In some embodiments, the housing is a shell housing formed by one or more segments.

In some embodiments, the housing may be coupled to the container, or may be integral and unitary with the container.

According to another aspect of the disclosure, the fluid dispenser according to any of the foregoing is provided in combination with the container that contains a fluid.

Figure 3:
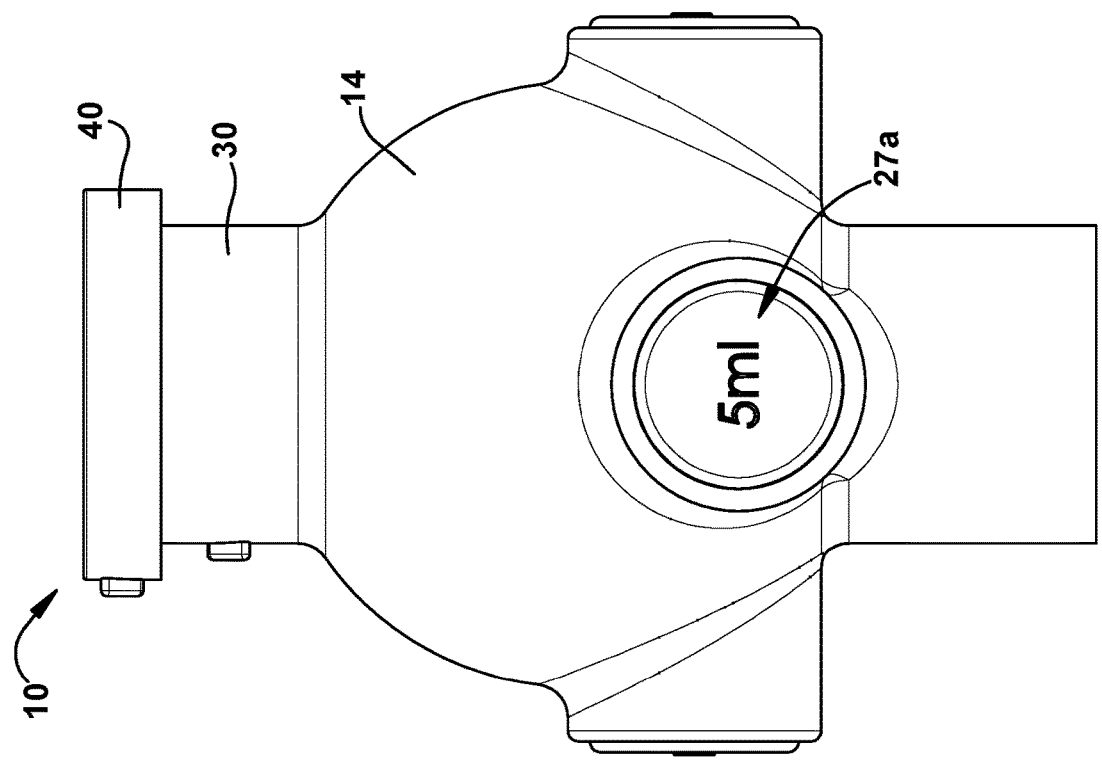
FIG. 3 is a right plan view of the fluid dispenser.
Figure 6:
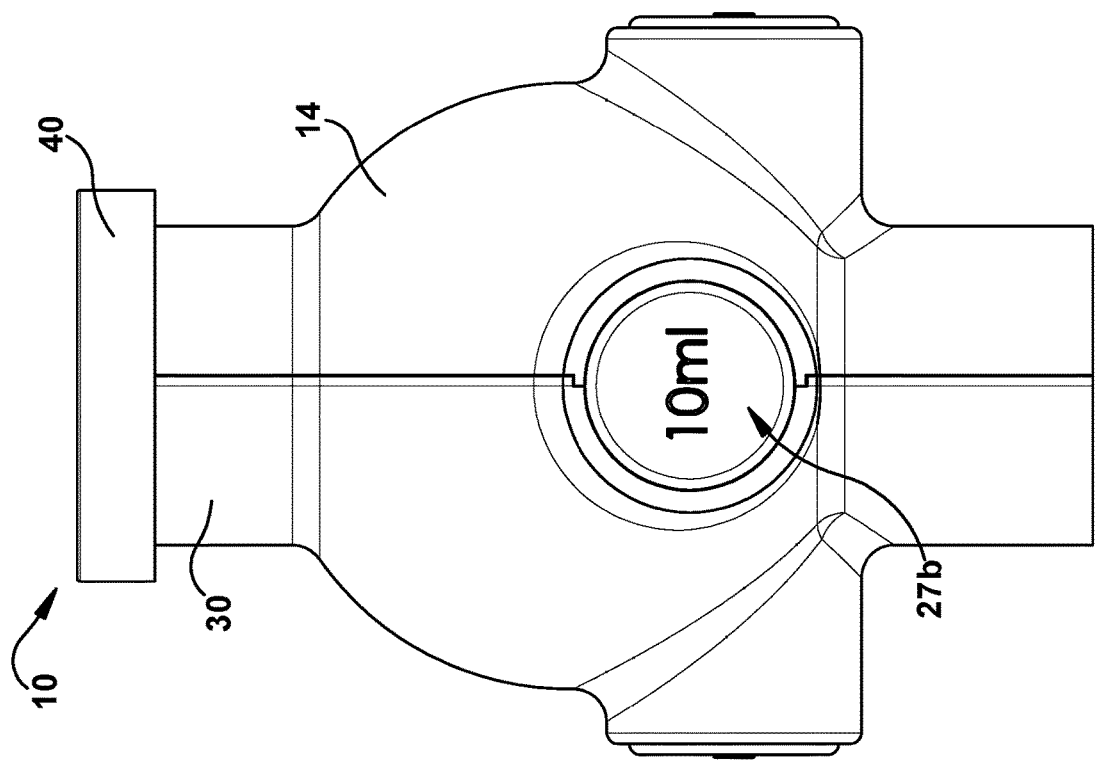
FIG. 6 is a rear plan view of the fluid dispenser.
Figure 5:
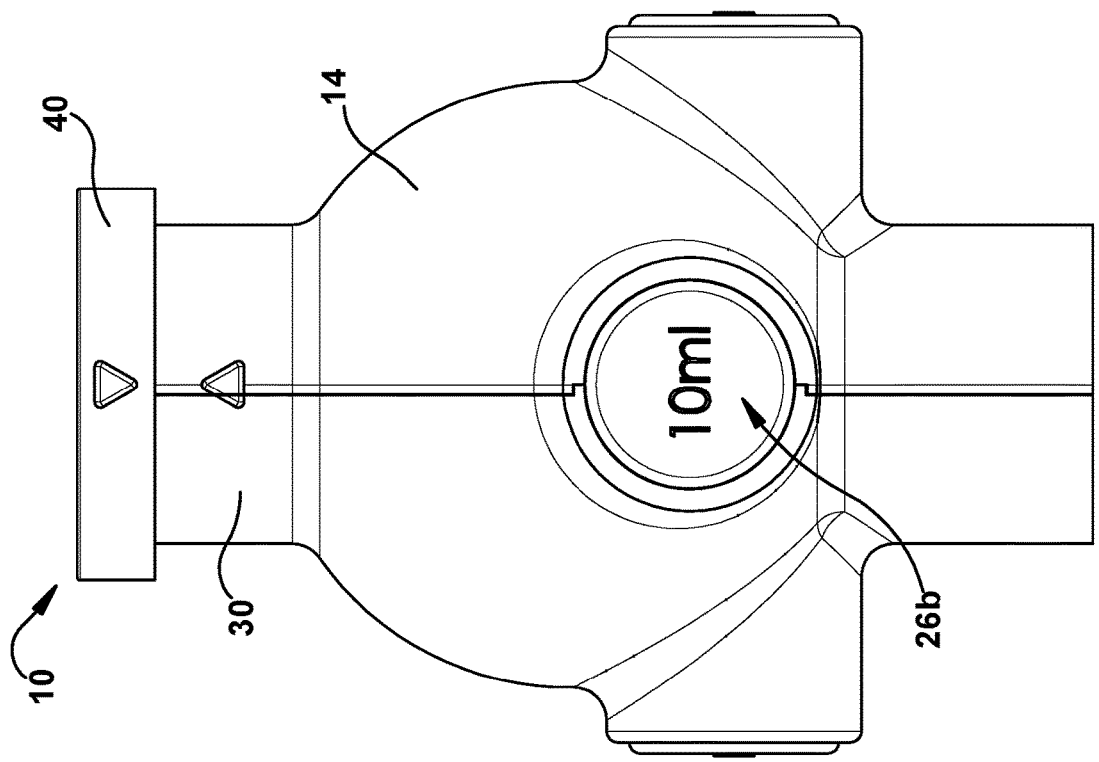
FIG. 5 is a front plan view of the fluid dispenser.

In the discussion above, the terms "upper", "lower", "top", "bottom," "end," "inner," "left," "right," "above," "below," "horizontal," "vertical," etc. refer to the measured fluid dispenser as viewed in a horizontal position, as shown in FIG. 3, for example. Such relative positional terms as used in this disclosure are understood to refer to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fluid dispenser for measuring and dispensing a fluid contained in a container, the fluid dispenser comprising:
    a housing having a measurement chamber that defines a volume for receiving a predefined quantity of the fluid, and an outlet opening in fluid communication with the measurement chamber for permitting the fluid contained in the measurement chamber to be dispensed therefrom;
    a fluid flow passage having an inlet configured to be in fluid communication with the fluid in the container when in use, and an outlet in fluid communication with the measurement chamber, the fluid flow passage being configured to permit fluid flow between the container and the measurement chamber when in use; and
    a valve member movable in the fluid flow passage between a first position and a second position;
    wherein in the first position the valve member is configured to open the fluid flow passage to permit fluid flow from the container to the measurement chamber to thereby allow the volume of the measurement chamber to fill with the predefined quantity of fluid;
    wherein in the second position the valve member is configured to close the fluid flow passage to thereby restrict fluid flow from the container to the measurement chamber, and to restrict fluid flow from the measurement chamber back to the container to thereby isolate the predefined quantity of fluid to the measurement chamber;
    wherein the valve member is a first valve member, wherein the first valve member has a reduced cross-sectional area portion, wherein at least another portion of the first valve member is configured to close the fluid flow passage when the reduced cross-sectional area portion is out of alignment with the fluid flow passage;
    the fluid dispenser further comprising a second valve member that cooperates with the first valve member to open the fluid flow passage;
    wherein the second valve member is movable in the fluid flow passage between a first position and a second position;
    wherein the second valve member has a second reduced cross-sectional area portion, wherein at least another portion of the second valve member is configured to close the fluid flow passage when the second reduced cross-sectional area portion is out of alignment with the fluid flow passage, and
    wherein the second valve member is configured to cooperate with the first valve member to open the fluid flow passage when the reduced cross-sectional area portion of the first valve member is at least partially aligned with the fluid flow passage, and when the second reduced cross-sectional area portion of the second valve member is at least partially aligned with both the reduced cross-sectional area portion of the first valve member and the fluid flow passage.

2. The fluid dispenser according to claim 1, wherein the fluid flow passage extends in a longitudinal direction, and wherein the valve member is movable relative to the housing in a direction transverse to the longitudinal direction.

3. The fluid dispenser according to claim 1, wherein a stem of the second valve member is configured as a guide sleeve, and wherein a stem of the first valve member is slidably disposed within the guide sleeve.

4. The fluid dispenser according to claim 1, wherein the first and second valve members are each spring-biased toward the closed position, and are each depressible by a user toward the open position.

5. The fluid dispenser according to claim 1, wherein the housing has a recessed portion for receiving an end portion of the valve member, the recessed portion have a recessed wall that acts as a stop to the movement of the valve member, in which the location of the stop corresponds to the first position of the first valve member to open the fluid flow path;
    in which the recessed wall has a through-hole for supporting and permitting movement of a valve stem of the valve member; and
    in which a spring is disposed within the recessed portion to spring-bias the valve member toward the closed position.

6. The fluid dispenser according to claim 1, wherein the measurement chamber is a first measurement chamber having a first volume, the housing having a second measurement chamber that defines a volume for measuring a predefined quantity of fluid.

7. The fluid dispenser according to claim 6, wherein the first measurement chamber has a different volume than the second measurement chamber.

8. The fluid dispenser according to claim 6, wherein the housing has a partition that at least partially defines the measurement chamber;
    wherein the partition has a first upper wall that cooperates with an internal surface of the housing to at least partially define the first measurement chamber, and has a second upper wall that cooperates with the internal surface of the housing to at least partially define the second measurement chamber;
    wherein the first measurement chamber has a different volume than the second measurement chamber; and
    wherein the first upper wall and the second upper wall are axially and radially offset from each other to cooperate with the corresponding portions of the internal surface of the housing.

9. The fluid dispenser according to claim 1, wherein the housing includes a spout portion, the spout portion having the outlet opening and forming at least a portion of the measurement chamber.

10. The fluid dispenser according to claim 1, further comprising a closure configured to close the outlet opening of the housing to contain the fluid therein.

11. The fluid dispenser according to claim 1 in combination with a container that contains a fluid.

12. A fluid dispenser for measuring and dispensing a fluid contained in a container, the fluid dispenser comprising:
    a housing having a measurement chamber that defines a volume for receiving a predefined quantity of the fluid, and an outlet opening in fluid communication with the measurement chamber for permitting the fluid contained in the measurement chamber to be dispensed therefrom;
    a fluid flow passage having an inlet configured to be in fluid communication with the fluid in the container when in use, and an outlet in fluid communication with the measurement chamber, the fluid flow passage being configured to permit fluid flow between the container and the measurement chamber when in use; and a valve member movable in the fluid flow passage between a first position and a second position;

wherein in the first position the valve member is configured to open the fluid flow passage to permit fluid flow from the container to the measurement chamber to thereby allow the volume of the measurement chamber to fill with the predefined quantity of fluid;

wherein in the second position the valve member is configured to close the fluid flow passage to thereby restrict fluid flow from the container to the measurement chamber, and to restrict fluid flow from the measurement chamber back to the container to thereby isolate the predefined quantity of fluid to the measurement chamber;

wherein the measurement chamber is a first measurement chamber having a first volume, the housing having a second measurement chamber that defines a volume for measuring a predefined quantity of fluid;

wherein the fluid dispenser further includes a second fluid flow passage having second inlet configured to be in fluid communication with the container when in use, and second outlet in fluid communication with the second measurement chamber, the fluid flow passage being configured to permit fluid flow between the container and the second measurement chamber when in use; and another valve member movable in the second fluid flow passage between a first position and a second position;

wherein in the first position the other valve member is configured to open the second fluid flow passage to permit fluid flow from the container to the second measurement chamber to thereby allow the volume of the second measurement chamber to fill with a predefined quantity of fluid; and wherein in the second position the other valve member is configured to close the second fluid flow passage to thereby restrict fluid flow from the container to the second measurement chamber, and to restrict fluid flow from the second measurement chamber back to the container to thereby isolate the predefined quantity of fluid to the second measurement chamber.

13. The fluid dispenser according to claim 12, wherein the fluid dispenser includes the first and second valve members, in which the first and second valve members constitute a first valve pair that cooperate to open and close the first fluid flow passage; and wherein the other valve member is a third valve member, the fluid dispenser further including a fourth valve member, in which the third and fourth valve members constitute a second valve pair that cooperate to open and close the second fluid flow passage; and in which the first valve pair has an indicator indicating the volume of the first measurement chamber, and the second valve pair has an indicator indicating the volume of the second measurement chamber.

14. A fluid dispenser for measuring and dispensing a fluid contained in a container, the fluid dispenser comprising:

a housing having a measurement chamber that defines a volume for receiving a predefined quantity of the fluid, and an outlet opening in fluid communication with the measurement chamber for permitting the fluid contained in the measurement chamber to be dispensed therefrom;

a fluid flow passage having an inlet configured to be in fluid communication with the fluid in the container when in use, and an outlet in fluid communication with the measurement chamber, the fluid flow passage being configured to permit fluid flow between the container and the measurement chamber when in use; and a valve member movable in the fluid flow passage between a first position and a second position;

wherein in the first position the valve member is configured to open the fluid flow passage to permit fluid flow from the container to the measurement chamber to thereby allow the volume of the measurement chamber to fill with the predefined quantity of fluid;

wherein in the second position the valve member is configured to close the fluid flow passage to thereby restrict fluid flow from the container to the measurement chamber, and to restrict fluid flow from the measurement chamber back to the container to thereby isolate the predefined quantity of fluid to the measurement chamber;

wherein the measurement chamber is a first measurement chamber having a first volume, the housing having a second measurement chamber that defines a second volume for measuring a second predefined quantity of fluid;

wherein the fluid flow passage is a first fluid flow passage, the fluid dispenser further including a second fluid flow passage having a second inlet configured to be in fluid communication with the container when in use, and a second outlet in fluid communication with the second measurement chamber, the second fluid flow passage being configured to permit fluid flow between the container and the second measurement chamber when in use;

wherein the valve member is movable in the fluid flow passage between the first and second position to open and close the first fluid flow passage, wherein in the first and second positions the valve member is configured to close the second fluid flow passage to thereby restrict fluid flow from the container to the second measurement chamber; and wherein the valve member is movable to a third position, in which the valve member is configured to open the second fluid flow passage to permit fluid flow from the container to the second measurement chamber to thereby allow the second volume of the measurement chamber to fill with the second predefined quantity of fluid, and wherein in the third position the valve member is configured to close the first fluid flow passage.

15. The fluid dispenser according to claim 14, wherein the fluid dispenser includes one or more biasing members that bias the valve member to the second position in which both the first and second fluid flow passages are closed.

16. The fluid dispenser according to claim 15, wherein the valve member includes two opposing biasing members on opposite sides of the valve member;

wherein the two opposing biasing members bias the valve member to the second position which is a center position of the valve member between the first and third positions.

17. The fluid dispenser according to claim 14, wherein the valve member for opening and closing the first and second fluid flow passages is a single valve member.

* * * * *